(12) United States Patent
Maeda et al.

(10) Patent No.: US 12,177,038 B2
(45) Date of Patent: *Dec. 24, 2024

(54) ANOMALY DETERMINATION METHOD, ANOMALY DETERMINATION DEVICE, AND RECORDING MEDIUM

(71) Applicant: Panasonic Intellectual Property Corporation of America, Torrance, CA (US)

(72) Inventors: Manabu Maeda, Osaka (JP); Toshihisa Nakano, Osaka (JP); Yoshiharu Imamoto, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,641

(22) Filed: Oct. 4, 2023

(65) Prior Publication Data

US 2024/0031199 A1 Jan. 25, 2024

Related U.S. Application Data

(63) Continuation of application No. 17/975,004, filed on Oct. 27, 2022, now Pat. No. 11,843,477, which is a (Continued)

(51) Int. Cl.
*H04L 12/40* (2006.01)

(52) U.S. Cl.
CPC .. *H04L 12/40071* (2013.01); *H04L 12/40104* (2013.01); *H04L 12/40176* (2013.01); (Continued)

(58) Field of Classification Search
CPC ......... H04L 12/40071; H04L 12/40104; H04L 12/40176; H04L 12/40; H04L 12/40032; (Continued)

(56) References Cited

U.S. PATENT DOCUMENTS 9,384,066 B1 7/2016 Leita
10,164,820 B2 * 12/2018 Yano ................. H04W 28/0242
(Continued)

FOREIGN PATENT DOCUMENTS

JP 2012-247978 12/2012
JP 2017-047835 3/2017
(Continued)

OTHER PUBLICATIONS

International Search Report (ISR) issued on Mar. 10, 2020 in International (PCT) Application No. PCT/JP2019/051105.
(Continued)

*Primary Examiner* — Rasheed Gidado
(74) *Attorney, Agent, or Firm* — Wenderoth, Lind & Ponack, L.L.P.

(57) ABSTRACT

In an anomaly determination method for determining an anomaly in a received message, a plurality of messages which include messages that are periodic and each of which includes a first field having a fixed value and a second field having a variable value are each received as the received message, and one of a plurality of combinations to be used for determination each of which includes at least one of a plurality of anomaly determinations including an anomaly determination utilizing a reception timing based on the periodicity or the number of received messages, an anomaly determination utilizing the first field, and an anomaly determination utilizing the second field, is selected according to one or more criteria among available execution time of the anomaly determination method, a load amount, a data amount, and the number of messages.

14 Claims, 40 Drawing Sheets

Related U.S. Application Data continuation of application No. 17/335,474, filed on Jun. 1, 2021, now Pat. No. 11,516,045, which is a continuation of application No. PCT/JP2019/051105, filed on Dec. 26, 2019.

(60) Provisional application No. 62/802,963, filed on Feb. 8, 2019.

(52) U.S. Cl.
CPC ............... *H04L 2012/40215* (2013.01); *H04L 2012/40273* (2013.01)

(58) Field of Classification Search
CPC . H04L 2012/40215; H04L 2012/40273; H04L 63/1425; H04L 67/12
See application file for complete search history.

(56) References Cited

U.S. PATENT DOCUMENTS

| | | | |
|---|---|---|---|
| 10,599,507 B2* | 3/2020 | Ito | G06F 11/14 |
| 10,757,121 B2 | 8/2020 | Dasgupta | |
| 2004/0030776 A1* | 2/2004 | Cantrell | H04L 69/161 |
| | | | 709/224 |
| 2007/0115850 A1 | 5/2007 | Tsuchiya | |
| 2010/0284283 A1 | 11/2010 | Golic | |
| 2011/0149891 A1 | 6/2011 | Ramakrishna | |
| 2016/0219071 A1* | 7/2016 | Vasseur | H04L 63/1425 |
| 2017/0013006 A1 | 1/2017 | Ujiie et al. | |
| 2018/0255072 A1 | 9/2018 | Takada | |
| 2018/0330253 A1* | 11/2018 | Gottschlich | G06N 20/00 |
| 2019/0181773 A1 | 6/2019 | Kawai | |
| 2019/0296935 A1* | 9/2019 | Hong | H04L 67/12 |
| 2020/0019582 A1* | 1/2020 | Bender | G06F 16/9566 |
| 2020/0019852 A1 | 1/2020 | Yoon | |
| 2020/0136890 A1* | 4/2020 | To | H04L 43/0852 |
| 2020/0186556 A1 | 6/2020 | Moriya | |

FOREIGN PATENT DOCUMENTS

| | | |
|---|---|---|
| WO | 2015/151418 | 10/2015 |
| WO | 2017/038351 | 3/2017 |
| WO | 2018/012322 | 1/2018 |

OTHER PUBLICATIONS

Extended European Search Report issued Jun. 23, 2022 in corresponding European Patent Application No. 19914510.3.

* cited by examiner

FIG. 2

| SOF | ID field | RTR | IDE | r | DLC | Data field | CRC | DEL | ACK | DEL | EOF |

FIG. 4

| Receiving ID list |
|---|
| 1 |
| 2 |
| 3 |
| 4 |

FIG.5

| Transfer source | Transfer destination | ID |
|---|---|---|
| Bus 200a | Bus 200b | * |
| Bus 200b | Bus 200a | 3 |

FIG. 7

| Determination function | Processing time | Detection performance | |
|---|---|---|---|
| | | Rate of false detection | Rate of detection |
| DoS attack | 1us | 0% | 100% |
| ID | 1us | 0% | 100% |
| Data length | 1us | 0% | 100% |
| Transmission period | 1us | 1% | 98% |
| Transmission frequency | 1us | 0% | 100% |
| Data value (range) | 3us | 0% | 100% |
| Data value (change) | 4us | 1% | 95% |
| Vehicle status | 5us | 0.5% | 100% |

FIG. 8

| Determination function | Processing time | Detection performance | |
|---|---|---|---|
| | | Rate of false detection | Rate of detection |
| DoS attack | 1us | 0% | 100% |
| DoS attack + ID | 2us | 0% | 100% |
| DoS attack + ID + data length | 3us | 0% | 100% |
| DoS attack + ID + data length + transmission period | 4us | 1% | 98% |
| DoS attack + ID + data length + transmission period + data value (range) | 6us | 1% | 100% |
| DoS attack + ID + data length + transmission period + data value (range) + vehicle status | 8us | 0.5% | 100% |
| DoS attack + ID + data length + transmission frequency | 4us | 0% | 100% |
| DoS attack + ID + data length + transmission frequency + data value (range) | 6us | 1% | 100% |
| DoS attack + ID + data length + transmission frequency + data value (range) + vehicle status | 8us | 0.5% | 100% |

FIG. 9

| Determination function | Processing time | Detection performance | |
|---|---|---|---|
| | | Rate of false detection | Rate of detection |
| DoS attack | 1us | 0% | 100% |
| DoS attack + ID | 2us | 0% | 100% |
| DoS attack + ID + data length | 3us | 0% | 100% |
| DoS attack + ID + data length + transmission period | 3us | 1% | 98% |
| DoS attack + ID + data length + data value (range) | 5us | 0% | 100% |
| DoS attack + ID + data length + data value (change) | 6us | 2% | 95% |
| DoS attack + ID + data length + transmission frequency | 4us | 0% | 100% |
| DoS attack + ID + data length + transmission period + data value (range) | 6us | 1% | 99% |
| DoS attack + ID + data length + transmission frequency + data value (range) | 6us | 1% | 99% |
| DoS attack + ID + data length + transmission period + data value (range) + vehicle status | 5us | 0% | 100% |
| DoS attack + ID + data length + transmission frequency + data value (range) + vehicle status | 8us | 0.5% | 100% |
| DoS attack + ID + data length + data value (range) + vehicle status | 5us | 0% | 100% |

FIG. 29

| No. | Determination functions that have not been performed ||||||| ID | DLC | Data |
| --- | --- | --- | --- | --- | --- | --- | --- | --- | --- | --- |
|  | DoS attack | ID | Period | Frequency | Data range | Data change | Status |  |  |  |
| 1 |  |  | ○ |  |  | ○ | ○ | 0x1 | 8 | ... |
| 2 |  |  |  |  | ○ |  |  | 0x4D | 4 | ... |
| ... |  |  |  |  |  |  |  |  |  |  |

FIG. 33

| Determination function | Selection condition |
|---|---|
| DoS attack | Always selected |
| ID | Always selected |
| Period | Not selected under high load |
| Data | Not selected under high load |
| Frequency | Always selected |
| Vehicle status | Not selected under high load |

FIG. 41

| Determination function | Selection condition |
| --- | --- |
| DoS attack | Always selected |
| ID + DoS attack | Always selected |
| ID + DoS attack + period | Not selected under high load |
| ID + DoS attack + period + data | Not selected under high load |
| ID + DoS attack + frequency | Always selected |
| ID + DoS attack + frequency + data | Not selected under high load |

ANOMALY DETERMINATION METHOD, ANOMALY DETERMINATION DEVICE, AND RECORDING MEDIUM

CROSS REFERENCE TO RELATED APPLICATIONS

This is a continuation of U.S. application Ser. No. 17/975,004, filed Oct. 27, 2022, which is a continuation of U.S. application Ser. No. 17/335,474, filed Jun. 1, 2021, now U.S. Pat. No. 11,516,045, which is a continuation application of PCT International Application No. PCT/JP2019/051105 filed on Dec. 26, 2019, designating the United States of America, which is based on and claims priority of U.S. Provisional Patent Application No. 62/802,963 filed on Feb. 8, 2019. The entire disclosures of the above-identified applications, including the specifications, drawings and claims are incorporated herein by reference in their entirety.

FIELD

The present disclosure relates to processing-load-dependent detection function determination methods, etc., that are applied at the time of detecting an anomalous message in an in-vehicle network.

BACKGROUND

Recent years have seen a large number of devices called electronic control units (ECUs) installed in automotive interior systems. A communication network connecting these ECUs is called an in-vehicle network. There are numerous communication standards for the in-vehicle network. Among these, a controller area network (hereinafter referred to as CAN) is one of the most dominant in-vehicle network standards.

In a network compliant with the CAN standard (hereinafter also referred to as a CAN network), a communication path (bus) is composed of two cables, and an ECU connected to the bus is also referred to as a node. Each node connected to the bus transmits and receives data in units of so-called frames or messages. In the CAN, an identifier indicating a data source or destination is not used.

A node that transmits a frame (hereinafter also referred to as a transmitting node) attaches, to each message, ID called a message ID, which indicates the type of the message, and transmits the message, in other words, sends a signal to the bus. A node that receives a message (hereinafter also referred to a receiving node) receives only a message including predetermined message ID, in other words, reads the signal from the bus. Messages including the same ID are transmitted at a regular interval.

As mentioned above, the large number of ECUs installed in the automotive interior systems are connected to the CAN network and exchange various data therebetween during operation.

There is a risk that an ECU having a function of communicating with an element external to the CAN network may be wrongfully controlled by an unidentified person through unauthorized external access or the like and transmit an anomalous message (also referred to as an attack message) to the CAN network. Such an ECU wrongfully controlled by an unidentified person (also referred to as an unauthorized ECU) can impersonate another ECU, transmit an anomalous message, and wrongfully control a vehicle, for example. A method for detecting a so-called spoofing attack is disclosed in Patent Literature (PTL) 1, for example.

CITATION LIST

Patent Literature

PTL 1: International Publication No. WO2015/151418

SUMMARY

Technical Problem

However, the method disclosed in PTL 1 has a problem in that, if the length of time for which an anomaly detection process for detecting an anomalous message sent to an in-vehicle network can be performed is short, the anomaly detection process is not performed.

Thus, the present disclosure presents an anomaly detection method, an anomaly detection device, etc., in which an effective anomaly detection process can be performed.

Solution to Problem

In order to solve the aforementioned problem, an anomaly determination method according to one aspect of the present disclosure is used to determine an anomaly in a received message and includes: receiving, as the received message, each of a plurality of messages that includes a first field having a fixed value and a second field having a variable value, the plurality of messages including messages that are periodic; and selecting one of a plurality of combinations to be used for determination, according to one or more criteria among available execution time of the anomaly determination method, a load amount, a data amount, and a total number of messages, each of the plurality of combinations including at least one of a plurality of anomaly determinations including an anomaly determination utilizing a reception timing based on the periodicity or a total number of received messages, an anomaly determination utilizing the first field, and an anomaly determination utilizing the second field.

Note that these general or specific aspects may be implemented using a system, a device, a method, an integrated circuit, a computer program, or a non-transitory computer-readable recording medium such as a compact disc read-only memory (CD-ROM), or any combination of systems, devices, methods, integrated circuits, computer programs, and recording media.

Advantageous Effects

With the anomaly determination method, etc., according to one aspect of the present disclosure, it is possible to perform an appropriate anomaly detection process in accordance with detection processing time.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a diagram illustrating the format of a message (data frame) in the CAN protocol according to Embodiment 1.

FIG. 4 is a diagram illustrating one example of a receiving ID list according to Embodiment 1.

FIG. 5 is a diagram illustrating one example of a transfer rule according to Embodiment 1.

FIG. 7 is a diagram illustrating one example of the relationship between a determination function, processing time, and detection performance according to Embodiment 1.

FIG. 8 is a diagram illustrating one example of the relationship between a determination function, processing time, and detection performance according to Embodiment 1.

FIG. 9 is a diagram illustrating one example of the relationship between a determination function, processing time, and detection performance according to Embodiment 1.

FIG. 29 is a diagram illustrating one example of unselected information according to Embodiment 3.

FIG. 33 is a table illustrating a determination function and a selection condition for the determination function according to a variation.

FIG. 41 is a table illustrating a determination function and a selection condition for the determination function according to a variation.

Figure 1:
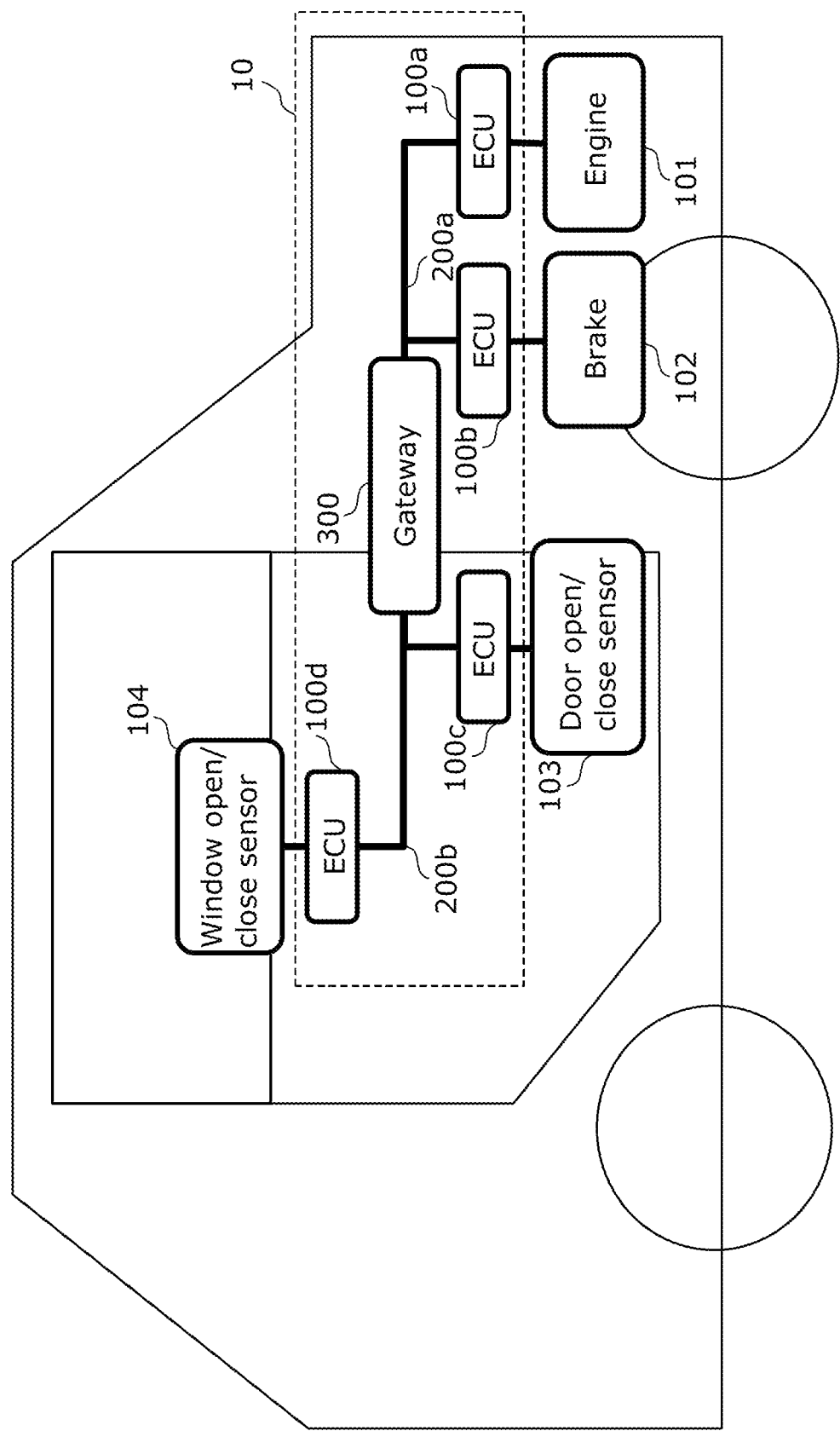
FIG. 1 is a block diagram illustrating the overall configuration of an in-vehicle network system according to Embodiment 1.

DESCRIPTION OF EMBODIMENTS (Underlying Knowledge Forming Basis of the Present Disclosure)

In the case where a function of detecting transmission of an anomalous message onto a CAN network generates a detection result and information related to the detection result as a log and outputs the log, a large amount of data is necessary to do a detailed follow-up check on how the anomaly was detected. This, however, imposes a huge time or resource cost when the memory capacity of a log destination or the communication traffic for sending the detection result to the log destination is large.

In view of this, an anomaly determination method according to one aspect of the present disclosure is used to determine an anomaly in a received message and includes: receiving, as the received message, each of a plurality of messages that includes a first field having a fixed value and a second field having a variable value, the plurality of messages including messages that are periodic; and selecting one of a plurality of combinations to be used for determination, according to one or more criteria among available execution time of the anomaly determination method, a load amount, a data amount, and a total number of messages, each of the plurality of combinations including at least one of a plurality of anomaly determinations including an anomaly determination utilizing a reception timing based on the periodicity or a total number of received messages, an anomaly determination utilizing the first field, and an anomaly determination utilizing the second field.

With this, it is possible to perform an appropriate anomaly detection process in accordance with detection processing time that is a limited time by the anomaly determination method according to one aspect of the present disclosure.

Furthermore, an anomaly determination device according to one aspect of the present disclosure is used in an in-vehicle network system including a network and one or more electronic control units connected to the network and includes: one or more processors; and storage accessible to the one or more processors. The one or more processors receive each of a plurality of messages including messages that are periodic and including a first field having a fixed value and a second field having a variable value from the network as a received message. The one or more processors select one of a plurality of combinations to be used for determination, according to one or more criteria among available execution time of the anomaly determination method, a load amount, a data amount, and a total number of messages. Each of the plurality of combinations includes at least one of a plurality of anomaly determinations including an anomaly determination utilizing a reception timing based on the periodicity or a total number of received messages, an anomaly determination utilizing the first field, and an anomaly determination utilizing the second field.

With this, the anomaly determination device according to one aspect of the present disclosure can perform an appropriate anomaly detection process in accordance with detection processing time that is a limited time.

Furthermore, a recording medium according to one aspect of the present disclosure is a non-transitory computer-readable recording medium having a program recorded thereon for causing the one or more processors in the above-described anomaly determination device to perform the above-described anomaly determination method.

With this, it is possible to perform an appropriate anomaly detection process in accordance with detection processing time.

Hereinafter, embodiments will be specifically described with reference to the drawings.

Each embodiment described below shows a general or specific example. The numerical values, shapes, materials, structural elements, the arrangement and connection of the structural elements, steps, the processing order of the steps, etc., shown in the following embodiments are mere examples, and therefore do not limit the present disclosure. Among the structural elements in the following embodiments, structural elements not recited in any one of the independent claims which indicate the broadest concepts will be described as structural elements that are arbitrarily included.

Embodiment 1

1. Outline

With reference to the drawings, the present embodiment will describe in detail the case where an in-vehicle network system determines an anomaly by appropriately controlling the execution of a function of determining an anomaly in accordance with available execution time of an anomaly detection process.

[1.1 Overall Configuration of In-Vehicle Network System]

FIG. 1 is a block diagram illustrating the overall configuration of an in-vehicle network system according to the present embodiment.

In FIG. 1, in-vehicle network system 10 has a CAN network and includes ECU 100a, ECU 100b, ECU 100c, ECU 100d, bus 200a, bus 200b, and gateway 300. Note that ECU 100a, ECU 100b, ECU 100c, ECU 100d, etc., are one example of the electronic control unit.

Hereinafter, there are cases where ECU 100a, ECU 100b, ECU 100c, and ECU 100d are collectively described as ECU 100, or an unspecified portion of ECU 100a, ECU 100b, ECU 100c, and ECU 100d is described as ECU 100.

Furthermore, hereinafter, there are cases where bus 200a and bus 200b are collectively described as bus 200, or an unspecified portion of bus 200a and bus 200b is described as bus 200.

ECU 100a is connected to engine 101, ECU 100b is connected to brake 102, ECU 100c is connected to door open/close sensor 103, and ECU 100d is connected to window open/close sensor 104.

ECU 100 obtains a message indicating the status of a connected device and periodically sends the obtained message indicating the status to bus 200. For example, ECU 100a obtains information about the number of revolutions which is one of the statuses of engine 101, attaches predetermined ID to a message including a data value indicating the number of revolutions, and sends the message to bus 200.

Furthermore, each ECU 100 reads, from bus 200, the message transmitted by another ECU 100 and selectively receives the message depending on the ID attached thereto. This selective reception will be described later.

Gateway 300 connects bus 200a to which ECU 100a and ECU 100b are connected and bus 200b to which ECU 100c and ECU 100d are connected. Gateway 300 has a function of transferring the message received from one bus 200 to the other bus 200. Gateway 300 is also one node in the CAN network.

Note that the in-vehicle network system is an example cited for the sake of explanation of a subject which determines whether or not the message is an anomalous message and to which the anomaly determination method, etc., can be applied; this application subject is not limited to the in-vehicle network system.

[1.2 Data Format of Message]

FIG. 2 is a diagram illustrating the format of a message (data frame) in the CAN protocol. Here, a message in the standard ID format in the CAN protocol is illustrated.

The message includes a start-of-frame (SOF), an ID field, a remote transmission request (RTR), an identifier extension (IDE), a reserved bit (r), a data length code (DLC), a data field, a cyclic redundancy check (CRC) sequence, a CRC delimiter ("DEL" on the left side in the figure), an acknowledgement (ACK) slot, an ACK delimiter ("DEL" on the right side in the figure), and an end-of-frame (EOF).

The SOF is a 1-bit dominant. The dominant means superiority. The dominant represents the state where a voltage is applied to two cables constituting a bus so as to transmit the value "0" in a CAN network that uses a digital scheme to transmit data, or represents the value "0" itself that is transmitted. In contrast, the state where a voltage is applied to two cables constituting a bus to transmit the value "1", or the value "1" itself that is transmitted, is called a recessive. The recessive means inferiority. When two nodes transmit the value "0" and the value "1" to the bus at the same time, the value "0" is given priority. The bus during idling is in the recessive state. Each ECU 100 starts transmitting the message by changing the status of bus 200 from the recessive state to the dominant state, and the other ECUs 100 read this change and perform synchronization. In FIG. 2, a solid line portion of lines of the message that indicate the dominant state and the recessive state indicates that the portion may have a corresponding dominant or recessive value. Regarding the SOF, which is fixed in the dominant state, the line for the dominant state is solid while the line for the recessive state is broken.

The ID is a 11-bit value indicating the type of data included in the message. The CAN is designed such that a higher priority is given to a message having a smaller ID value in communication arbitration between messages that two or more nodes start transmitting at the same time. The ID is synonymous to message ID and CAN ID.

The RTR is a 1-bit dominant indicating that the frame is a message.

The IDE is a 1-bit dominant. The message is also referred to as a data frame.

The DLC is a 4-bit value indicating the length of the data field that follows.

The data field is a value indicating the content of data that is transmitted; the maximum length of the data field is 64 bits, and the length thereof can be adjusted in units of 8 bits. The specification about allocation of data that is being sent to this section depends on the vehicle type or the manufacturer.

The CRC sequence is a 15-bit value calculated using transmission values of the SOF, the ID field, the control field, and the data field.

The CRC delimiter is a 1-bit recessive-fixed punctuation symbol marking the end of the CRC sequence. The receiving node determines the presence or absence of an anomaly by comparing a result calculated from the values of the SOF, the ID field, the control field, and the data field of the received message with the value of the CRC sequence.

The ACK slot is 1-bit long; using this portion, the transmitting node transmits a recessive. The receiving node transmits a dominant as an acknowledgement response upon successful receipt of the message up to the CRC sequence. Because the dominant is given priority, when the communication of one message is normal up to the CRC sequence, bus 200 during transmission of the ACK slot is dominant.

The ACK delimiter is a 1-bit recessive-fixed punctuation symbol marking the end of the ACK slot.

The EOF is 7-bit long and fixed in the recessive state and indicates the end of the message.

[1.3 Configuration of Gateway]

Figure 3:
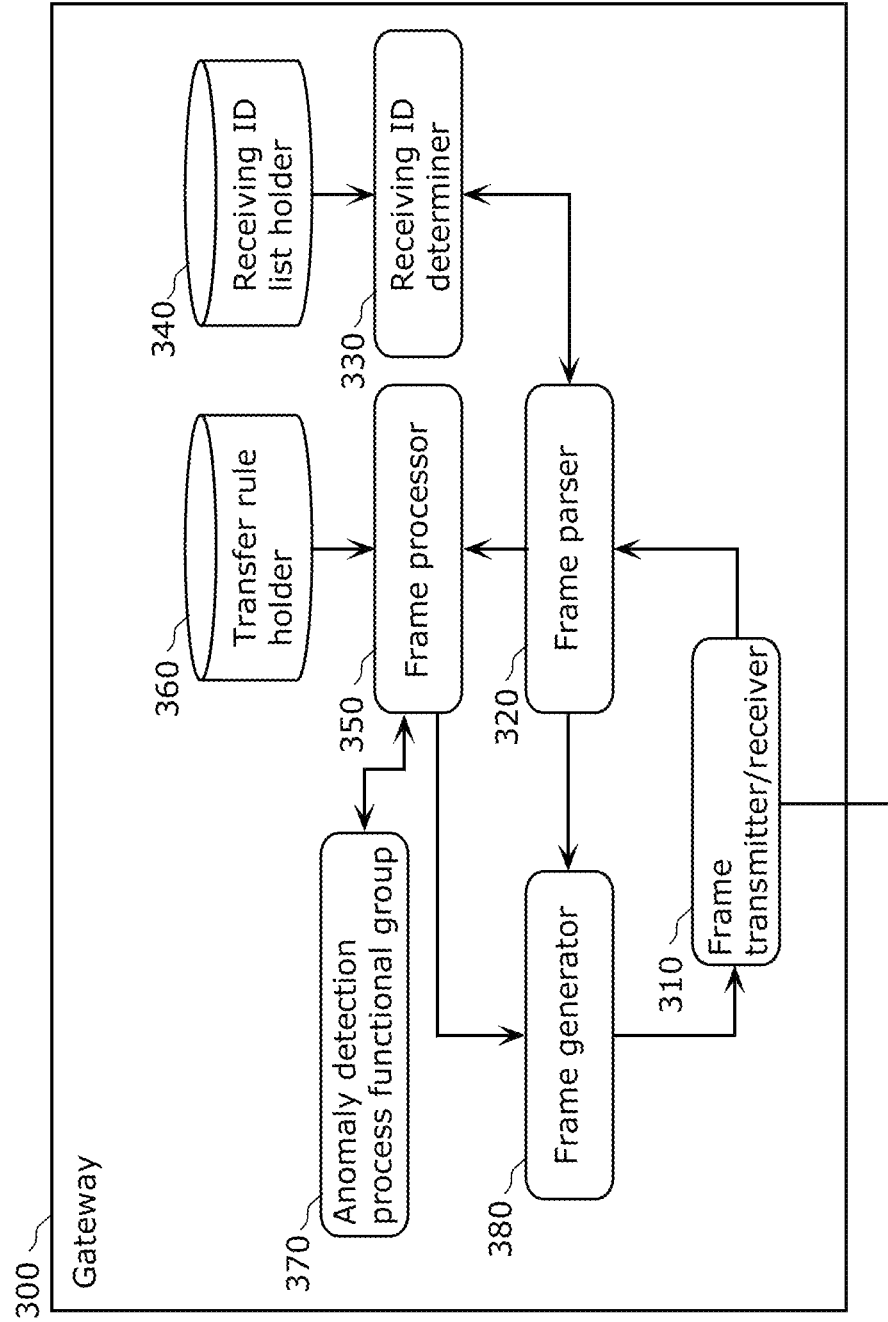
FIG. 3 is a block diagram illustrating one example of a gateway included in an in-vehicle network system according to Embodiment 1.

FIG. 3 is a block diagram illustrating one example of gateway 300 included in in-vehicle network system 10 according to Embodiment 1. In FIG. 3, gateway 300 includes frame transmitter/receiver 310, frame parser 320, receiving ID determiner 330, receiving ID list holder 340, frame processor 350, transfer rule holder 360, anomaly detection process functional group 370, and frame generator 380.

Note that these elements represent functions; gateway 300 is provided as an information processing device including, for example, a processing unit which is a processor, storage which is a semiconductor memory or the like, and an input/output unit or the like which is an input/output port.

The above elements representing the functions read, from the processor, a program held in the storage, execute the program, and record predetermined data in the storage. Alternatively, these elements may transmit and receive data via the input/output unit instead of recording the predetermined data in the storage.

Furthermore, these may be combined to provide the above elements representing the functions.

Frame transmitter/receiver 310 transmits and receives messages compliant with the CAN protocol to and from each of buses 200a, 200b.

More specifically, frame transmitter/receiver 310 reads, on a bit-by-bit basis, the message sent to bus 200, and transfers the read message to frame parser 320.

Furthermore, frame transmitter/receiver 310 sends the message to buses 200a, 200b on a bit-by-bit basis in accordance with bus information transmitted from frame generator 380.

Frame transmitter/receiver 310 transfers a message between buses 200 by transmitting, to bus 200b, the message received from bus 200a, and transmitting, to bus 200a, the message received from bus 200b.

Frame parser 320 receives values of the message from frame transmitter/receiver 310 and parses the received message through mapping of the values into fields in the CAN protocol. Frame parser 320 transfers, to receiving ID determiner 330, a series of values parsed as the values of the ID field.

Furthermore, according to the determination result sent from receiving ID determiner 330, frame parser 320 determines whether to transfer the values of the ID field of the message and the data fields appearing after the ID field to frame processor 350 or to stop receiving the message.

When frame parser 320 determines that the received message is not compliant with the CAN protocol, frame parser 320 requests frame generator 380 to transmit an error frame.

The error frame is a frame in a predetermined format specified in the CAN protocol and different from the format of the above-described message that is transmitted from a node when an error occurs in the CAN network. When the error frame is sent to a bus, message transmission in the network is interrupted.

Furthermore, when frame parser 320 interprets receipt of the error frame transmitted by another node, frame parser 320 discards a message that is being read.

Receiving ID determiner 330 receives the values of the ID field from frame parser 320 and determines, with reference to a list of message IDs held by receiving ID list holder 340, whether or not to receive the read message. Receiving ID determiner 330 sends the determination result to frame parser 320.

Receiving ID list holder 340 holds a list of message IDs which gateway 300 receives (also referred to as a receiving ID list). FIG. 4 is a diagram illustrating one example of a receiving ID list according to Embodiment 1. Details of the receiving ID list in FIG. 4 will be described later.

Frame processor 350 determines transfer destination bus 200 according to the ID of the received message by following a data-transfer-related rule held by transfer rule holder 360 and sends, to frame generator 380, information indicating transfer destination bus 200, the message ID sent by frame parser 320, and the data to be transferred.

Furthermore, frame processor 350 sends, to anomaly detection process functional group 370, the message received from frame parser 320, and requests anomaly detection process functional group 370 to determine whether or not the message is an anomalous message. Frame processor 350 does not transfer a message determined by anomaly detection process functional group 370 as an anomalous message.

Transfer rule holder 360 holds a rule related to data transfer for each bus 200 (hereinafter also referred to as a transfer rule). FIG. 5 is a diagram illustrating one example of the transfer rule according to Embodiment 1. Details of the transfer rule in FIG. 5 will be described later.

Anomaly detection process functional group 370 is a functional group that determines whether or not a message that is being received is an anomalous message. Details of functional elements included in anomaly detection process functional group 370 will be described later. Anomaly detection process functional group 370 sends the determination result to frame processor 350.

Frame generator 380 generates an error frame according to the error frame transmission request received from frame parser 320 and causes frame transmitter/receiver 310 to send the error frame.

Furthermore, frame generator 380 generates a message frame using the message ID and the data received from frame processor 350 and sends the message frame to frame transmitter/receiver 310 together with the bus information.

[1.4 Receiving ID List]

As illustrated in FIG. 4, the receiving ID list is a list of the message IDs of messages that are received and processed by gateway 300 and is held by receiving ID list holder 340.

In FIG. 4, the receiving ID list stores a message ID in each row. The message IDs in the receiving ID list in FIG. 4 are "1", "2", "3", and "4", and gateway 300 receives messages having these message IDs. Gateway 300 stops receiving messages having message IDs that are not included in the receiving ID list.

Note that the values of IDs and the number of IDs included in the receiving ID list are one example for the sake of explanation; the configuration of the receiving ID list that is used by gateway 300 is not limited to this example.

[1.5 Transfer Rule]

The transfer rule is held in transfer rule holder 360. In FIG. 5, the combination of transfer source bus 200 and transfer destination bus 200 for the message and the message ID of a transfer target is stored in each row as the transfer rule.

Specifically, the first row of the transfer rule indicates the transfer source "bus 200a", the transfer destination "bus 200b", and the ID "*", meaning a rule to the effect that gateway 300 transfers, to bus 200b, a message received from bus 200a regardless of what ID the message has. The second row of the transfer rule indicates the transfer source "bus 200b", the transfer destination "bus 200a", and the ID "3", meaning a rule to the effect that gateway 300 transfers, to bus 200a, a message whose ID is "3" among messages received from bus 200b.

[1.6 Configuration of Anomaly Detection Process Functional Group]

Figure 6:
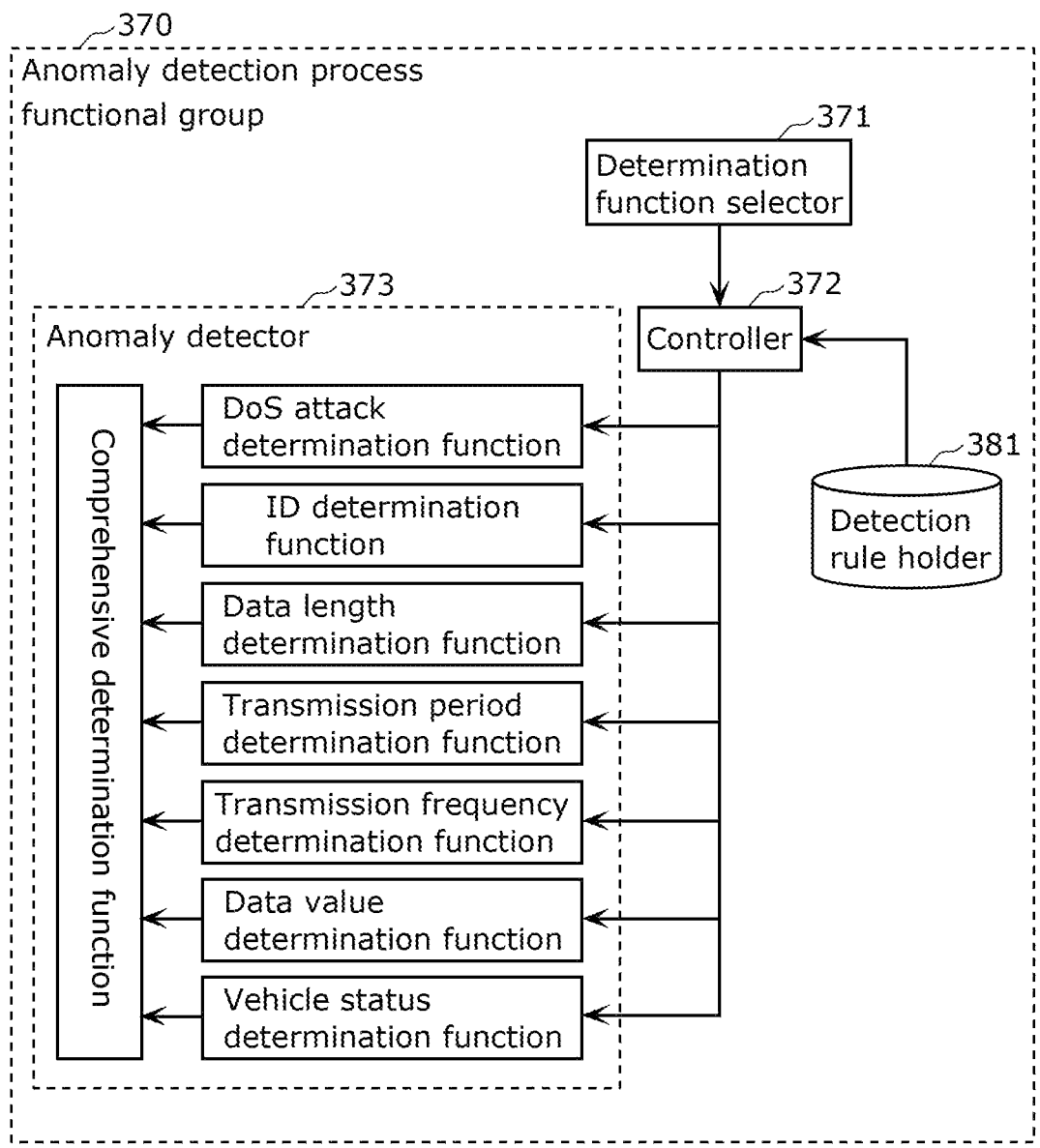
FIG. 6 is a block diagram illustrating one example of an anomaly detection process functional group according to Embodiment 1.

FIG. 6 is a block diagram illustrating one example of the anomaly detection process functional group according to Embodiment 1. In FIG. 6, anomaly detection process functional group 370 includes determination function selector 371, controller 372, anomaly detector 373, and detection rule holder 381.

Note that these elements represent functions and are implemented by the processor reading and executing a program held in the storage, by the processor storing predetermined data into the storage, or by the processor transmitting and receiving data via the input/output unit, in gateway 300, or are implemented by a combination of these processes.

Determination function selector 371 selects a determination function to be performed, from among determination functions of anomaly detector 373, and sends the selected determination function to controller 372. Determination function selector 371 calculates available time for the anomaly detection process of anomaly detector 373 (detection processing time), and selects a determination function so as not to exceed the detection processing time. FIG. 7 is a diagram illustrating one example of the relationship between the determination function, the processing time, and the detection performance according to Embodiment 1. For example, determination function selector 371 holds the processing time for each determination function and the detection performance (for example, the rate of false detection and the rate of detection) such as those illustrated in FIG. 7, obtains a combination of determination functions that can be performed within the detection processing time calculated by determination function selector 371, and selects the determination function. At this time, if there is more than one combination of determination functions that can be performed within the detection processing time calculated by determination function selector 371, a combination having the best detection performance (for example, a combination that is low in the rate of false detection and high in the rate of detection) is selected.

Controller 372 causes that anomaly detector 373 to perform the function selected by determination function selector 371 among the determination functions of anomaly detector 373.

Anomaly detector 373 includes at least seven types of determination functions. Specifically, these determination functions include a function of determining the presence or absence of a DoS attack from the amount of messages transmitted per unit of time (the message amount is also referred to as a data amount), a function of checking the ID field of the message, a function of checking the data length of the message, a function of checking, for each CAN ID, a period of message transmission (the period may be a time interval), a function of checking, for each CAN ID, the frequency of message transmission, and a function of checking the value of the data field of the message (the value of the data field is referred to as a data value).

The above functions are referred to as a DoS attack determination function, an ID determination function, a data length determination function, a transmission period determination function, a transmission frequency determination function, and a data value determination function in sequence. Examples of anomaly determination utilizing a reception timing based on the periodicity or the number of received messages include the DoS attack determination function, the transmission period determination function, and the transmission frequency determination function. Examples of anomaly determination utilizing a field having a fixed value include the ID determination function. The field having a fixed value such as the ID field is a specific example of the first field. In addition, examples of anomaly determination utilizing a field having a variable value include the data length determination function and the data value determination function. The field having a variable value such as the data field is a specific example of the second field.

Another function included is to recognize the status of a vehicle and check the vehicle status on the basis of the determination results of the aforementioned determination functions, the transmission period, the frequency, the data value, and the amount of change in the data value. This function is referred to as a vehicle status determination function. Furthermore, anomaly detector 373 includes a comprehensive determination function of comprehensively determining, from the determination results of the aforementioned determination functions, whether or not the message received from frame processor 350 is an anomalous message. The determination result of the comprehensive determination function is ultimately the result of the detection process performed by anomaly detector 373.

Detection ruler holder 381 holds required determination criteria for performing the determination functions. Detection ruler holder 381 holds a determination criterion unique to each CAN ID. There are cases where anomaly detector 373 does not perform the determination functions because no detection rules are set. Controller 372 controls the execution of the determination functions in accordance with the determination criteria stored in detection rule holder 381.

Note that the determination criterion hold by detection rule holder 381 corresponds to each CAN ID as mentioned above and furthermore, the determination criterion varies for each determination function. Furthermore, the determination function for which the determination criterion exists varies for each CAN ID. Moreover, for one determination function, there can be more than one determination criterion corresponding to each CAN ID. Thus, the determination function preferentially selected by determination function selector 371 varies for each CAN ID of the received message.

Note that determination function selector 371 selects a combination of determination functions that has the best detection performance if there is more than one combination of determination functions that can be performed within the calculated detection processing time, but this is not limiting. For example, a combination that is low in the rate of false detection and high in the rate of detection is selected, but this is not limiting. Determination function selector 371 may select a combination of determination functions using only one of the rate of false detection and the rate of detection as the detection performance, or may use, instead of the rate of false detection or the rate of detection, an evaluation index showing detection performance, such as detection accuracy (precision), an F-score (F-measure), informedness, or markedness, or a combination thereof. Thus, using an appropriate index for each system, determination function selector 371 can select an effective combination of determination functions that corresponds to a target system.

Note that determination function selector 371 obtains combinations of determination functions that can be performed within the calculated detection processing time and selects an appropriate combination from among these combinations of determination functions, but this is not limiting. FIG. 8 is a diagram illustrating one example of the relationship between the determination function, the processing time, and the detection performance according to Embodiment 1. As illustrated in FIG. 8, for example, in the case of performing the processing from the DoS attack determination function to the ID determination function, the data length determination function, the transmission period determination function, the data value (range) determination function, and the vehicle status determination function in sequence, a range of determination functions to be performed and a range of determination functions not to be performed may be selected. Here, the processing sequence of the determination functions is one example and is not limited thereto. The execution sequence of the determination functions may be different, and another determination function may be added to the determination functions described above.

FIG. 9 is a diagram illustrating one example of the relationship between the determination function, the processing time, and the detection performance according to Embodiment 1. Determination function selector 371 may hold, in advance, the processing time and the detection performance in association with each of the combinations of the determination functions such as those illustrated in FIG. 9 and select one of the combinations that have been held. This allows anomaly detector 373 to perform the processing of the determination functions in an appropriate sequence for each system and appropriately select the determination functions to be performed. Furthermore, at the time of designing, for example, the determination function to be selected by determination function selector 371 can be determined in advance to reduce time required for the selection.

Note that determination function selector 371 obtains a combination of determination functions that can be performed within the calculated detection processing time and selects the determination functions, but this is not limiting. For example, when anomaly detector 373 detects some anomaly, anomaly detector 373 always selects a determination function by which the anomaly has been detected, but is not required to select a part or all of determination functions by which no anomaly has been detected. When anomaly detector 373 detects no anomaly, anomaly detector 373 may select the minimum required determination function that can be performed within the detection processing time. Thus, the anomaly determination process of the determination function by which an anomaly has been detected is continuously selected by anomaly detector 373, and therefore continuous anomaly detection is possible. Furthermore, when anomaly detector 373 detects no anomaly, anomaly detection processing time can be shortened.

Note that in the case where frame transmitter/receiver 310 receives messages from a plurality of networks connected to gateway 300, anomaly detector 373 may select a determination function so that a longer anomaly detection process is performed on a message received from a network that transmits messages having impact on the operation of the vehicle if an anomaly occurs than on a message received from a network that transmits messages having no impact on the operation of the vehicle even if an anomaly occurs. Furthermore, anomaly detector 373 may decide, for each message, which of the determination functions is to be selected. With this, it is more likely that anomaly detector 373 can sufficiently secure the detection processing time for important messages; therefore, in-vehicle network system 10 has improved security.

Note that determination function selector 371 may calculate the detection processing time by eliminating, from the time permitted between message receipt by gateway 300 and transfer completion (permitted time), transfer processing time required for a transfer process such as determination of transfer destination bus 200 or the process of actual transmission of the message from frame transmitter/receiver 310 to each bus 200. Furthermore, determination function selector 371 may calculate the detection processing time by eliminating, from the permitted time, not only the transfer time, but also other necessary processing time. This allows in-vehicle network system 10 to preferentially perform the anomaly detection process over other processes or conversely preferentially perform other processes over the anomaly detection process.

Note that determination function selector 371 calculates the detection processing time, but this is not limiting; anomaly detection process functional group 370 may include a processing time calculator, determination function selector 371 may obtain processing time from the processing time calculator and select a determination function or anomaly detection process functional group 370 may receive the detection processing time from frame processor 350 and select a determination function on the basis of the received detection processing time. Thus, in the case where an element different from anomaly detection process functional group 370 also calculates the processing time, it is possible to efficiently calculate the processing time.

[1.7 Configuration of ECU]

Figure 10:
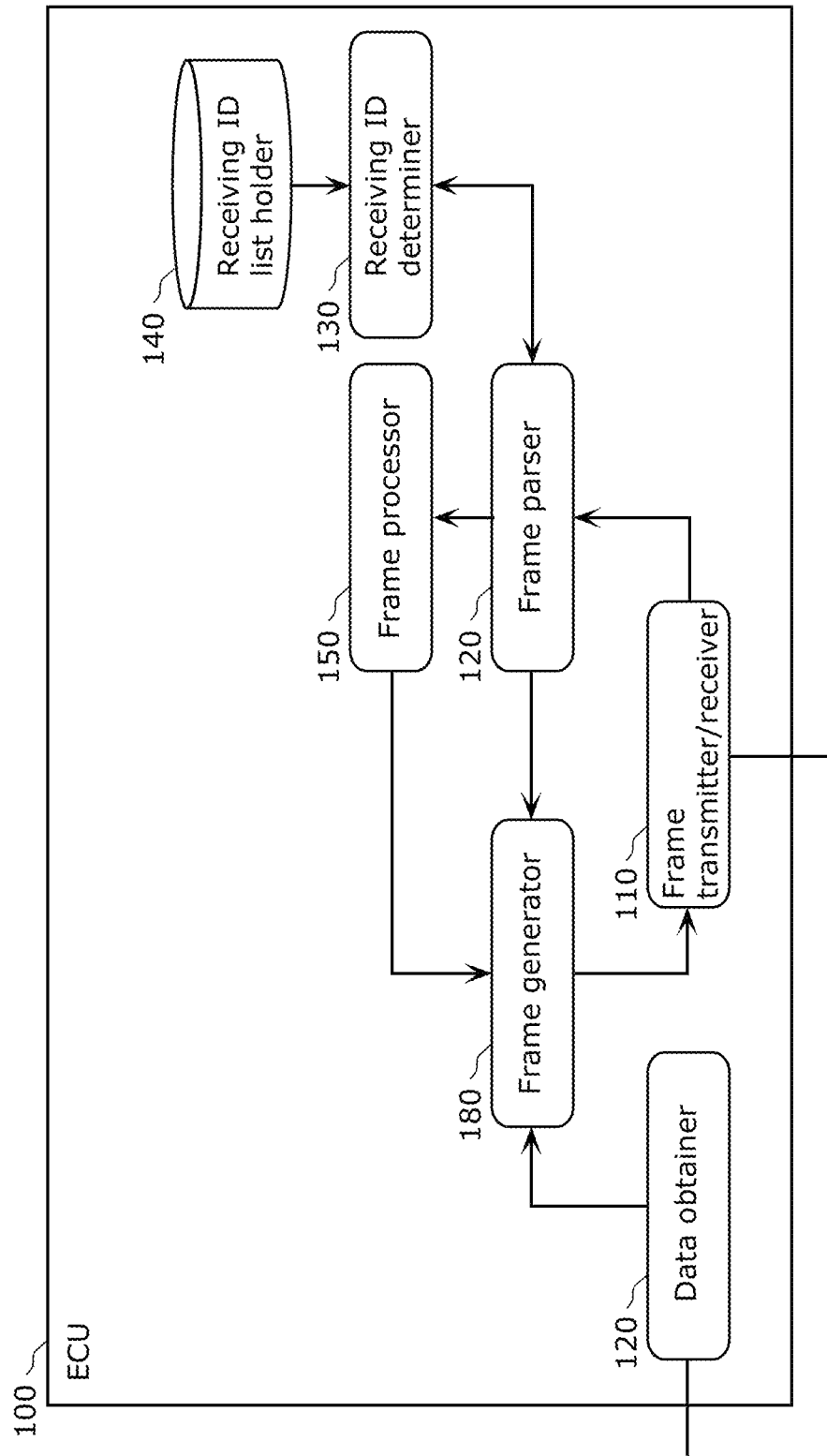
FIG. 10 is a block diagram illustrating one example of an ECU included in an in-vehicle network system according to Embodiment 1.

FIG. 10 is a block diagram illustrating one example of an ECU included in the in-vehicle network system according to Embodiment 1. In FIG. 10, ECU 100 includes frame transmitter/receiver 110, frame parser 120, receiving ID determiner 130, receiving ID list holder 140, frame processor 150, data obtainer 170, and frame generator 180.

Note that these elements represent functions and are implemented by the processor reading and executing a program held in the storage, by the processor storing predetermined data into the storage, or by the processor transmitting and receiving data via the input/output unit, in gateway 300, or are implemented by a combination of these processes.

Frame transmitter/receiver 110 transmits and receives messages compliant with the CAN protocol to and from bus 200.

More specifically, frame transmitter/receiver 110 reads, on a bit-by-bit basis, the message sent to bus 200, and transfers the read message to frame parser 120.

Furthermore, frame transmitter/receiver 110 sends, to bus 200, the message sent by frame generator 180.

Frame parser 120 receives values of the message from frame transmitter/receiver 110 and parses the received message through mapping of the values into fields in the CAN protocol. Frame parser 120 transfers a series of values parsed as the values of the ID field to receiving ID determiner 130.

Furthermore, according to the determination result sent from receiving ID determiner 130, frame parser 120 determines whether to transfer the values of the ID field included in the message and the values of the data fields appearing after the ID field to frame processor 150 or to stop receiving the message.

When frame parser 120 determines that the target message is not compliant with the CAN protocol, frame parser 120 requests frame generator 180 to transmit an error frame.

Furthermore, when frame parser 120 interprets receipt of the error frame transmitted by another node, frame parser 120 discards a message that is being read.

Receiving ID determiner 130 receives the values of the ID field from frame parser 120 and determines, with reference to a list of message IDs held by receiving ID list holder 140, whether or not to receive the read message. Receiving ID determiner 130 sends the determination result to frame parser 120.

Receiving ID list holder 140 holds a receiving ID list which ECU 100 receives. The receiving ID list is in substantially the same form as that illustrated in FIG. 4, and thus description thereof is omitted here.

Frame processor 150 performs processing according to the data of the received message. The content of the processing is different for each ECU 100.

For example, when ECU 100a receives a message indicating that a door is open while the vehicle travels at a speed higher than 30 km per hour, ECU 100a performs the process for producing an alarming sound. When a door is opened while a message indicating the absence of braking action is received, ECU 100c performs the process for producing an alarming sound.

These processes are one example cited for the sake of explanation; ECU 100 may perform other processes. Frame processor 150 causes frame generator 180 to generate a frame to be sent to perform such processes.

Data obtainer 170 obtains output data indicating the status of a device connected to ECU 100 or a measurement value, etc., of a sensor, and transfers the obtained output data to frame generator 180.

Frame generator 180 generates an error frame according to the error frame transmission request received from frame parser 120 and sends the error frame to frame transmitter/receiver 110.

Furthermore, frame generator 180 attaches predetermined message ID to the value of the data received from data obtainer 170, generates a message frame, and sends the generated message frame to frame transmitter/receiver 110.

[1.8 Transfer Process]

Figure 11:
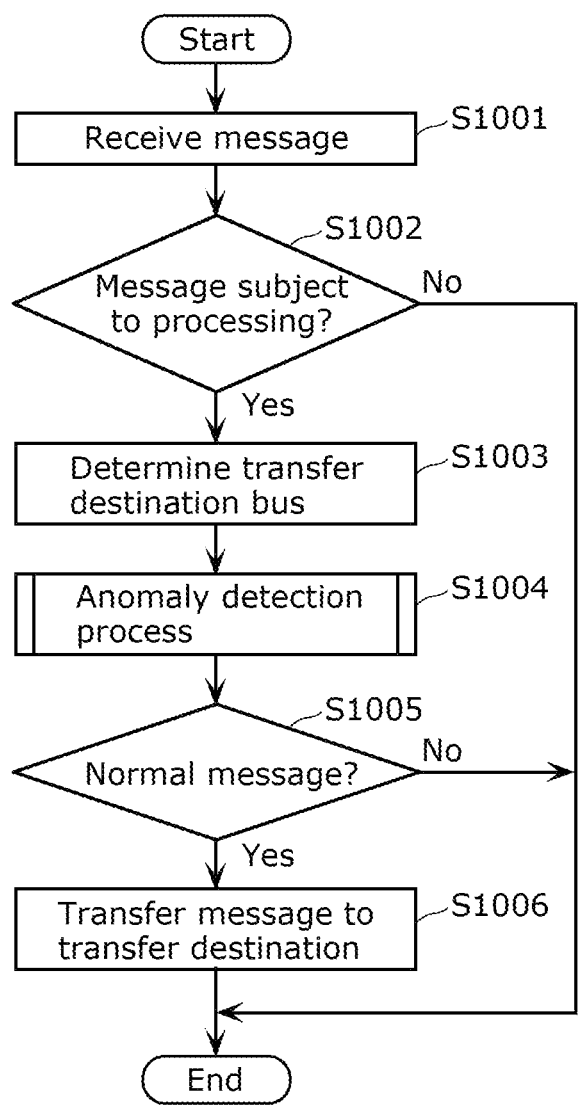
FIG. 11 is a flowchart illustrating one example of a transfer process according to Embodiment 1.

FIG. 11 is a flowchart illustrating one example of the transfer process according to Embodiment 1. Since the transfer process which gateway 300 performs is the same regardless of the transfer direction, the following describes, as one example, the case where gateway 300 transfers, to bus 200b, the message received from bus 200a.

First, frame transmitter/receiver 310 reads a message from bus 200a (Step S1001). Frame transmitter/receiver 310 sends the data of each field of the read message to frame parser 320.

Next, in cooperation with receiving ID determiner 130, frame parser 120 determines, from the value of the ID field of the read message (message ID), whether or not the message is subject to processing (Step S1002).

When frame parser 120 determines that the read message is not subject to the processing (No in Step S1002), the message is not transferred.

When frame parser 120 determines that the read message is subject to the processing (Yes in Step S1002), frame parser 120 transfers the value of each field of the message to frame processor 350. Subsequently, frame processor 350 determines a transfer destination bus in accordance with the transfer rule held in transfer rule holder 360 (Step S1003).

Frame processor 350 sends, to anomaly detection process functional group 370, the value of each field of the message received from frame parser 320, and requests anomaly detection process functional group 370 to determine whether or not the message is an anomalous message. Anomaly detection process functional group 370 determines, from the value of each field of the sent message, whether or not the sent message is an anomalous message, and sends the determination result to frame processor 350 (Step S1004).

When anomaly detection process functional group 370 determines that the message is an anomalous message (Yes in Step S1005), the message is not transferred.

When anomaly detection process functional group 370 determines that the message is not an anomalous message, but is a normal message (No in Step S1005), frame processor 350 requests frame generator 380 to transfer the message to the transfer destination bus determined in Step S1003.

In response to the request from frame processor 350, frame generator 380 generates a message so that the designated transfer destination receives the message, and causes frame transmitter/receiver 310 to send the message (Step S1006).

Note that in the above example, after the transfer destination for the received message is determined (Step S1003), whether or not the message is an anomalous message is determined (Step S1004), but this is not limiting. The determination on whether or not the received message is an anomalous message may come before the determination of the transfer destination for the message.

Alternatively, the transfer destination for the received message may be determined in parallel with the determination on whether or not the message is an anomalous message.

[1.9 Anomaly Detection Process]

Figure 12:
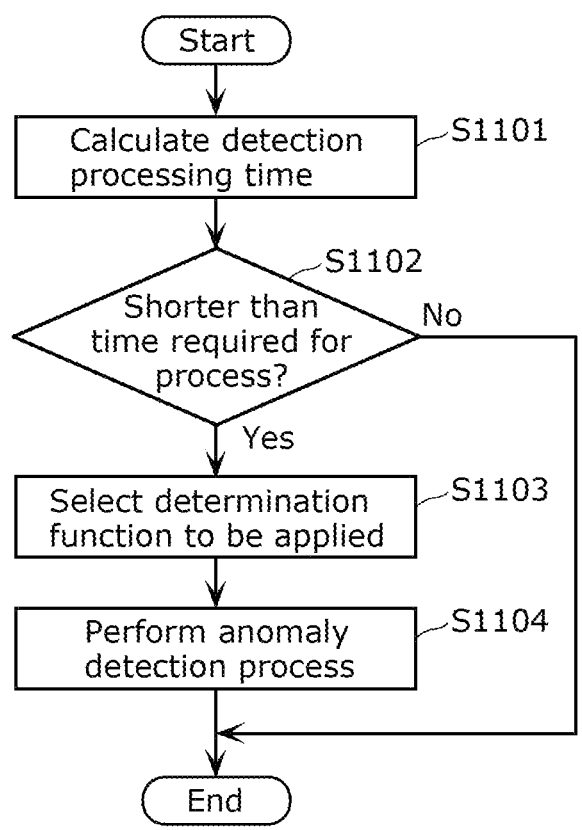
FIG. 12 is a flowchart illustrating another example of an anomaly detection process according to Embodiment 1.

FIG. 12 is a flowchart illustrating another example of the anomaly detection process according to Embodiment 1.

First, in response to the request for the anomaly detection process from frame processor 350, anomaly detection process functional group 370 calculates available time for the anomaly detection process (Step S1101). Here, the available time for the anomaly detection process is referred to as detection processing time. The detection processing time is calculated according to the amount of messages sent to the network, the amount of data included in the messages, the number of message transfer destinations, and the like.

Next, determination function selector 371 determines whether or not the calculated detection processing time is shorter than time required for the detection process (Step S1102).

When determination function selector 371 determines that the calculated detection processing time is shorter than the time required for the detection process (Yes in Step S1102), determination function selector 371 selects a determination function to be applied (Step S1103).

Subsequently, determination function selector 371 sends information about the selected determination function to controller 372.

Subsequently, controller 372 controls each determination function so as to perform only the function selected by determination function selector 371 in Step S1103, and anomaly detector 373 performs the anomaly detection process (Step S1104).

When determination function selector 371 determines that the detection processing time is longer than the time required for the detection process (No in Step S1102), controller 372 controls each determination function of anomaly detector 373 so that anomaly detector 373 performs all the detection processes that are supposed to be performed.

Figure 13:
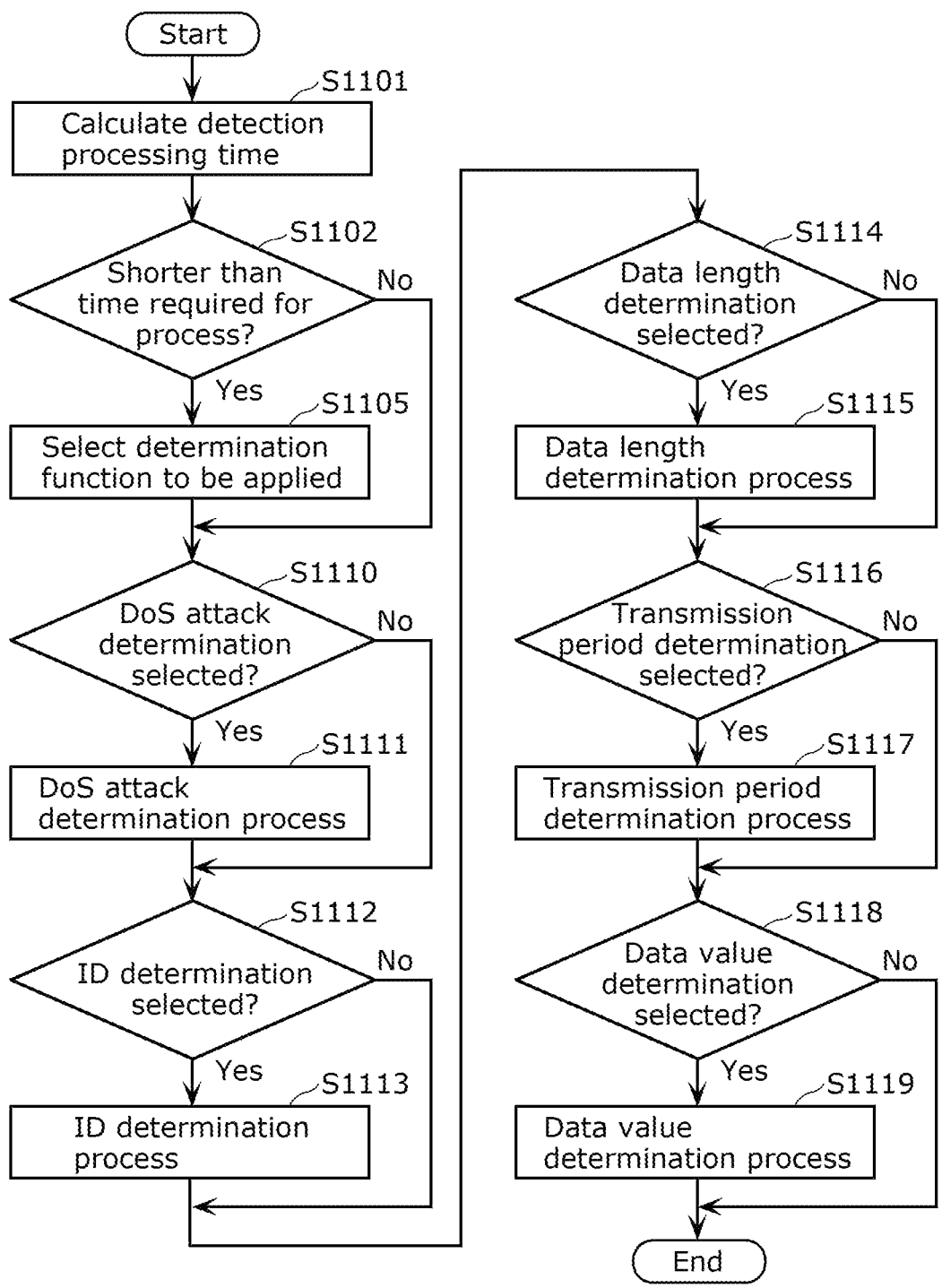
FIG. 13 is a flowchart illustrating yet another example of an anomaly detection process according to Embodiment 1.

Note that in the case where determination function selector 371 individually selects a determination function to be applied, the process performed in a step in FIG. 12 in which the anomaly detection process is performed (Step S1104) becomes the process performed from Step S1110 to Step S1119 in FIG. 13. FIG. 13 is a flowchart illustrating yet another example of the anomaly detection process according to Embodiment 1. The process performed in Step S1103 in FIG. 12 in which determination function selector 371 select a determination function to be applied becomes the process performed in Step S1105 in FIG. 13.

When determination function selector 371 determines that the calculated detection processing time is shorter than the time required for the detection process (Yes in Step S1102), determination function selector 371 selects a determination function that is applicable within the detection processing time (Step S1105). Subsequently, determination function selector 371 sends information about the selected determination function to controller 372.

When determination function selector 371 determines that the calculated detection processing time is longer than the time required for the detection process (No in Step S1102), Step S1110 described below is performed.

Controller 372 determines whether or not determination function selector 371 has selected the DoS attack determination function (Step S1110).

When controller 372 determines that determination function selector 371 has selected the DoS attack determination function (Yes in Step S1110), controller 372 performs the DoS attack determination function of anomaly detector 373 (Step S1111).

When controller 372 determines that the DoS attack determination function has not been selected (No in Step S1110), controller 372 does not perform the DoS attack determination function of anomaly detector 373.

Subsequently, controller 372 determines whether or not determination function selector 371 has selected the ID determination function (Step S1112).

When controller 372 determines that determination function selector 371 has selected the ID determination function (Yes in Step S1112), controller 372 performs the ID determination function of anomaly detector 373 (Step S1113).

When controller 372 determines that determination function selector 371 has not selected the ID determination function (No in Step S1112), controller 372 does not perform the ID determination function of anomaly detector 373.

Next, controller 372 determines whether or not determination function selector 371 has selected the data length determination function (Step S1114).

When controller 372 determines that determination function selector 371 has selected the data length determination function (Yes in Step S1114), controller 372 performs the data length determination function of anomaly detector 373 (Step S1115).

When controller 372 determines that determination function selector 371 has not selected the data length determination function (No in Step S1114), controller 372 does not perform the data length determination function of anomaly detector 373.

Controller 372 determines whether or not determination function selector 371 has selected the transmission period determination function (Step S1116).

When controller 372 determines that determination function selector 371 has selected the transmission period determination function (Yes in Step S1116), controller 372 performs the transmission period determination function of anomaly detector 373 (Step S1117).

When controller 372 determines that determination function selector 371 has not selected the transmission period determination function (No in Step S1116), controller 372 does not perform the transmission period determination function of anomaly detector 373.

Controller 372 determines whether or not determination function selector 371 has selected the data value determination function (Step S1118).

When controller 372 determines that determination function selector 371 has selected the data value determination function (Yes in Step S1118), controller 372 performs the data value determination function of anomaly detector 373 (Step S1119).

When controller 372 determines that determination function selector 371 has not selected the data value determination function (No in Step S1118), controller 372 does not perform the data value determination function of anomaly detector 373.

The foregoing describes the anomaly detection process related to five determination functions, namely, the DoS attack determination, the ID determination, the data length determination, the transmission period determination, and the data value determination, but the anomaly detection process may further include an anomaly detection process related to the transmission frequency determination and the vehicle status determination. Furthermore, the anomaly detection process may include a combination of some of the above determination functions or may include another determination function that has not been described. For example, the anomaly detection process may include a process in which controller 372 determines whether or not determination function selector 371 has selected each determination function and according to the determination result, controller 372 controls the execution of the determination function. This allows flexible control of a determination function that is to be performed.

Figure 14:
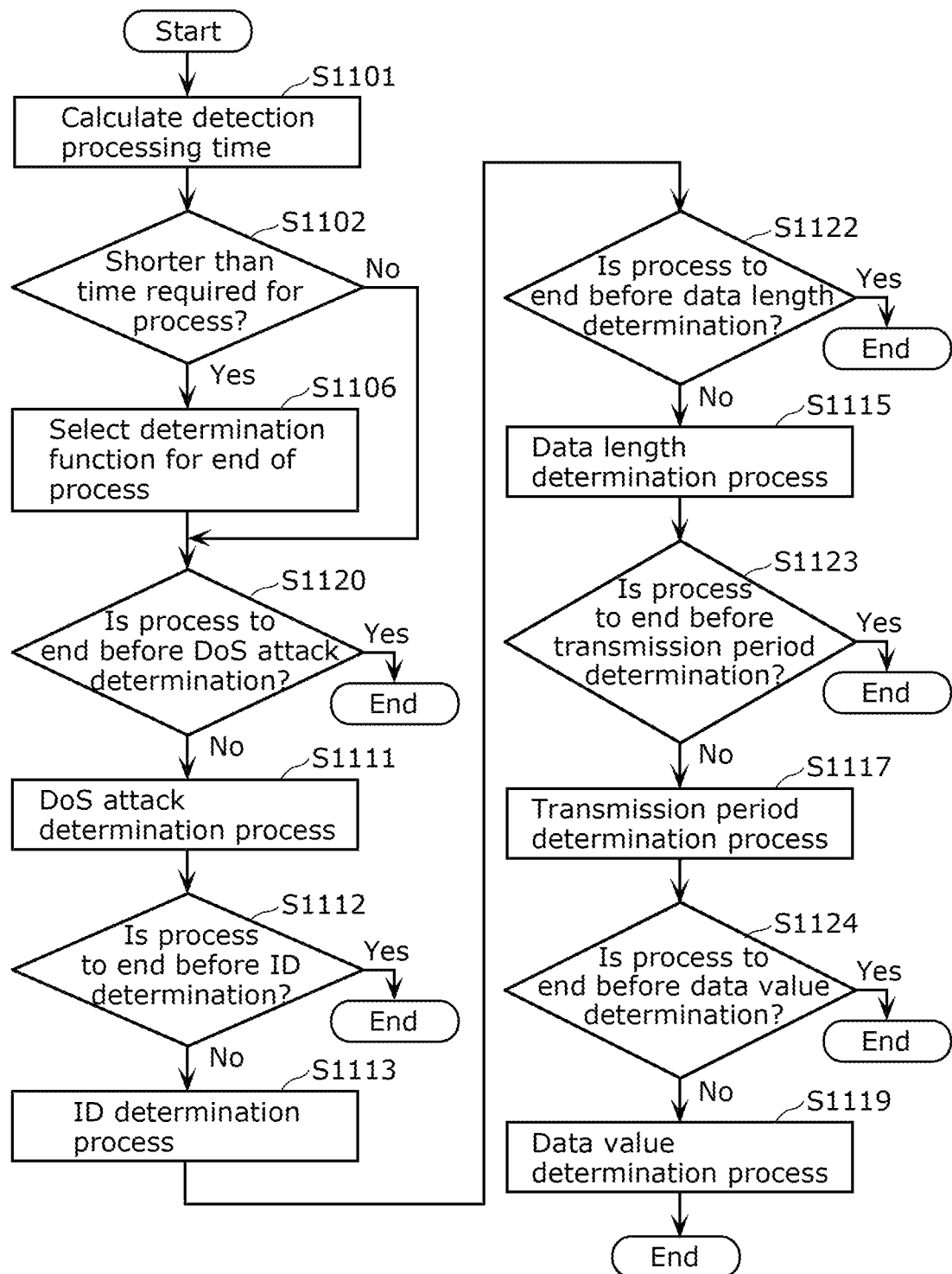
FIG. 14 is a flowchart illustrating another example of an anomaly detection process according to Embodiment 1.

Note that in the case where determination function selector 371 selects a range of determination functions to be performed and a range of determination functions not to be performed, the process performed in a step in FIG. 12 in which the anomaly detection process is performed (S1104) becomes the process illustrated in FIG. 14. The process performed in Step S1103 in FIG. 12 in which determination function selector 371 selects a function becomes the process performed in Step S1106 in FIG. 14.

FIG. 14 is a flowchart illustrating another example of the anomaly detection process according to Embodiment 1. When determination function selector 371 determines that the detection processing time is shorter than the time required for the detection process (Yes in Step S1102), determination function selector 371 determines a determination function that is applicable within the detection processing time, and selects a determination function to be performed at the end of the anomaly detection process (Step S1106).

Subsequently, determination function selector 371 sends the result to controller 372.

When determination function selector 371 determines that the detection processing time is longer than the time required for the detection process (No in Step S1102), Step S1120 described below is performed.

Controller 372 determines whether or not determination function selector 371 has selected an option to end the process before the DoS attack determination function (Step S1120).

When controller 372 determines that determination function selector 371 has selected an option not to end the process before the DoS attack determination function (No in Step S1120), controller 372 performs the DoS attack determination function of anomaly detector 373 (S1111).

When controller 372 determines that determination function selector 371 has selected an option to end the process before the DoS attack determination function (Yes in Step S1120), controller 372 ends the anomaly detection process.

Subsequently, controller 372 determines whether or not determination function selector 371 has selected an option to end the process before the ID determination function (Step S1112).

When controller 372 determines that determination function selector 371 has selected an option not to end the process before the ID determination function (No in Step S1112), controller 372 performs the ID determination function of anomaly detector 373 (Step S1113).

When controller 372 determines that determination function selector 371 has selected an option to end the process before the ID determination function (Yes in Step S1112), controller 372 ends the anomaly detection process.

Next, controller 372 determines whether or not determination function selector 371 has selected an option to end the process before the data length determination function (Step S1122).

When controller 372 determines that determination function selector 371 has selected an option not to end the process before the data length determination function (No in Step S1122), controller 372 performs the data length determination function of anomaly detector 373 (Step S1115).

When controller 372 determines that an option to end the process before the data length determination function has been selected (Yes in Step S1122), controller 372 ends the anomaly detection process.

Furthermore, controller 372 determines whether or not determination function selector 371 has selected an option to end the process before the transmission period determination function (Step S1123).

When controller 372 determines that determination function selector 371 has selected an option not to end the process before the transmission period determination function (No in Step S1123), controller 372 performs the transmission period determination function of anomaly detector 373 (Step S1117).

When controller 372 determines that determination function selector 371 has selected an option to end the process before the transmission period determination function (Yes in Step S1123), controller 372 ends the anomaly detection process.

Next, controller 372 determines whether or not determination function selector 371 has selected an option to end the process before the data value determination function (Step S1124).

When controller 372 determines that determination function selector 371 has selected an option not to end the process before the data value determination function (No in Step S1124), controller 372 performs the data value determination function of anomaly detector 373 (Step S1119).

When controller 372 determines that determination function selector 371 has selected an option to end the process before the data value determination function (Yes in Step S1124), controller 372 ends the anomaly detection process.

The foregoing describes the anomaly detection process related to five determination functions, namely, the DoS attack determination, the ID determination, the data length determination, the transmission period determination, and the data value determination, but the process illustrated in FIG. 14 may further include an anomaly detection process related to the transmission frequency determination and the vehicle status determination. Furthermore, the process illustrated in FIG. 14 may be a combination of some of the above-described determination functions or may include another determination function. The process illustrated in FIG. 14 may include a process in which controller 372 determines whether or not determination function selector 371 has selected a range of determination functions to be performed and a range of determination functions not to be performed, and according to the determination result, controller 372 controls the execution of the determination functions. With this, there is no need to check, for each and every determination function, whether or not the determination function has been selected, and the processing time can be reduced.

Figure 15:
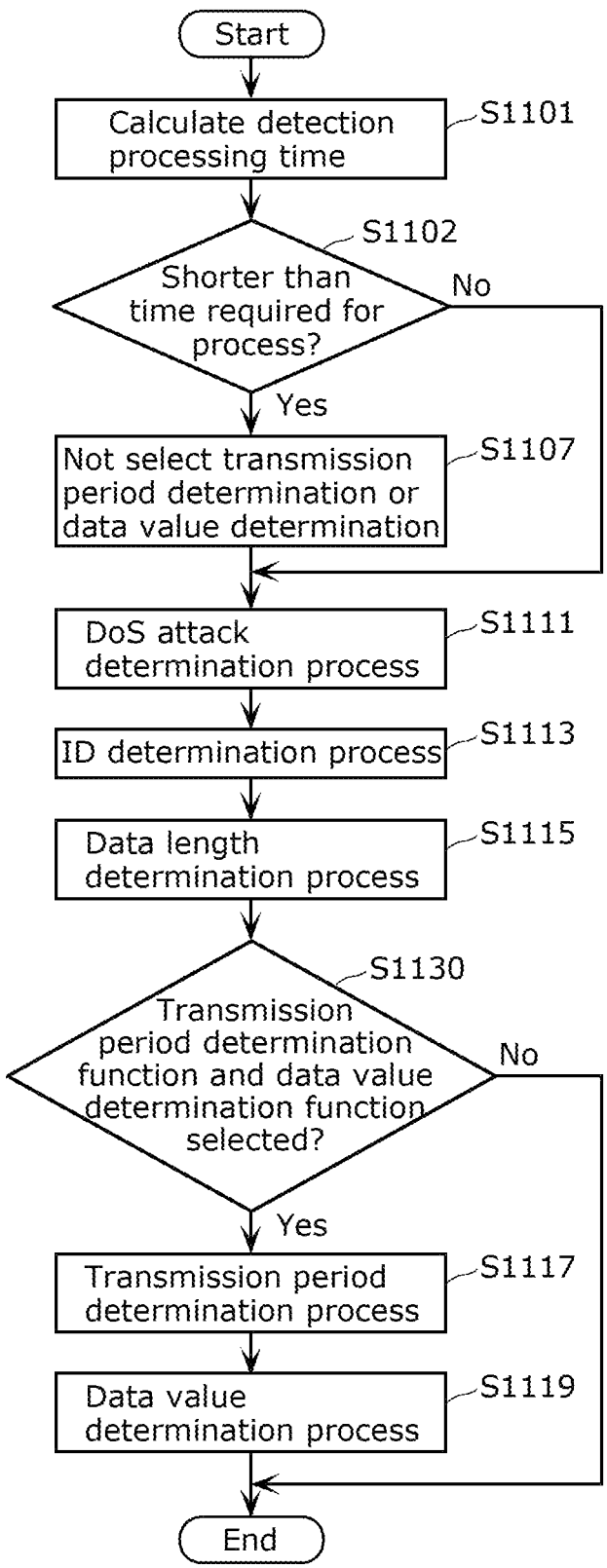
FIG. 15 is a flowchart illustrating yet another example of an anomaly detection process according to Embodiment 1.

Note that in the case where determination function selector 371 performs only selection of whether or not to perform the transmission period determination function and the data value determination function, a step in FIG. 12 in which the anomaly detection process is performed (Step S1104) becomes the process illustrated in FIG. 15.

FIG. 15 is a flowchart illustrating yet another example of the anomaly detection process according to Embodiment 1. The process performed in Step S1103 in FIG. 12 in which determination function selector 371 selects a determination function becomes the process performed in Step S1107 in FIG. 15.

Determination function selector 371 determines whether or not the detection processing time calculated in Step S1101 is longer than the time required for the anomaly detection process related to the transmission period determination function and the data value determination function (Step S1102).

When determination function selector 371 determines that the detection processing time is shorter than the required time mentioned above (Yes in Step S1102), determination function selector 371 does not select the transmission period determination function or the data value determination function (Step S1107).

When determination function selector 371 determines that the detection processing time is longer than the required time mentioned above (No in Step S1102), Step S1111 described next is performed.

Controller 372 performs the process of the DoS attack determination function (Step S1111).

Furthermore, controller 372 performs the process of the ID determination function (Step S1113).

Next, controller 372 performs the process of the data length determination function (Step S1115).

Subsequently, controller 372 determines whether or not determination function selector 371 has selected the transmission period determination function and the data value determination function (Step S1130).

When controller 372 determines that determination function selector 371 has selected the transmission period determination function and the data value determination function (Yes in Step S1130), controller 372 performs the transmission period determination function of anomaly detector 373 (Step S1117).

Subsequently, controller 372 performs the process of the data value determination function (Step S1119).

When controller 372 determines that determination function selector 371 has not selected the transmission period determination function or the data value determination function (No in Step S1130), controller 372 does not perform the transmission period determination function or the data value determination function of anomaly detector 373.

The foregoing describes the anomaly detection process related to five determination functions, namely, the DoS attack determination, the ID determination, the data length determination, the transmission period determination, and the data value determination, but the process illustrated in FIG. 15 may further include an anomaly detection process related to the transmission frequency determination and the vehicle status determination. The process illustrated in FIG. 15 may be a combination of some of the above-described determination functions or may include another determination function. It is sufficient that the process illustrated in FIG. 15 be a process in which, in addition to selecting only whether or not to perform the transmission period determination function and the data value determination function, controller 372 determines whether or not determination function selector 371 has selected a combination of some of the determination functions, and according to the determination result, controller 372 controls the execution of the determination functions. With this, a combination of processes to be performed can be determined in advance at the time of designing or the like, and it is possible to collectively check whether or not the determination functions have been selected, allowing a reduction in processing time.

Figure 16:
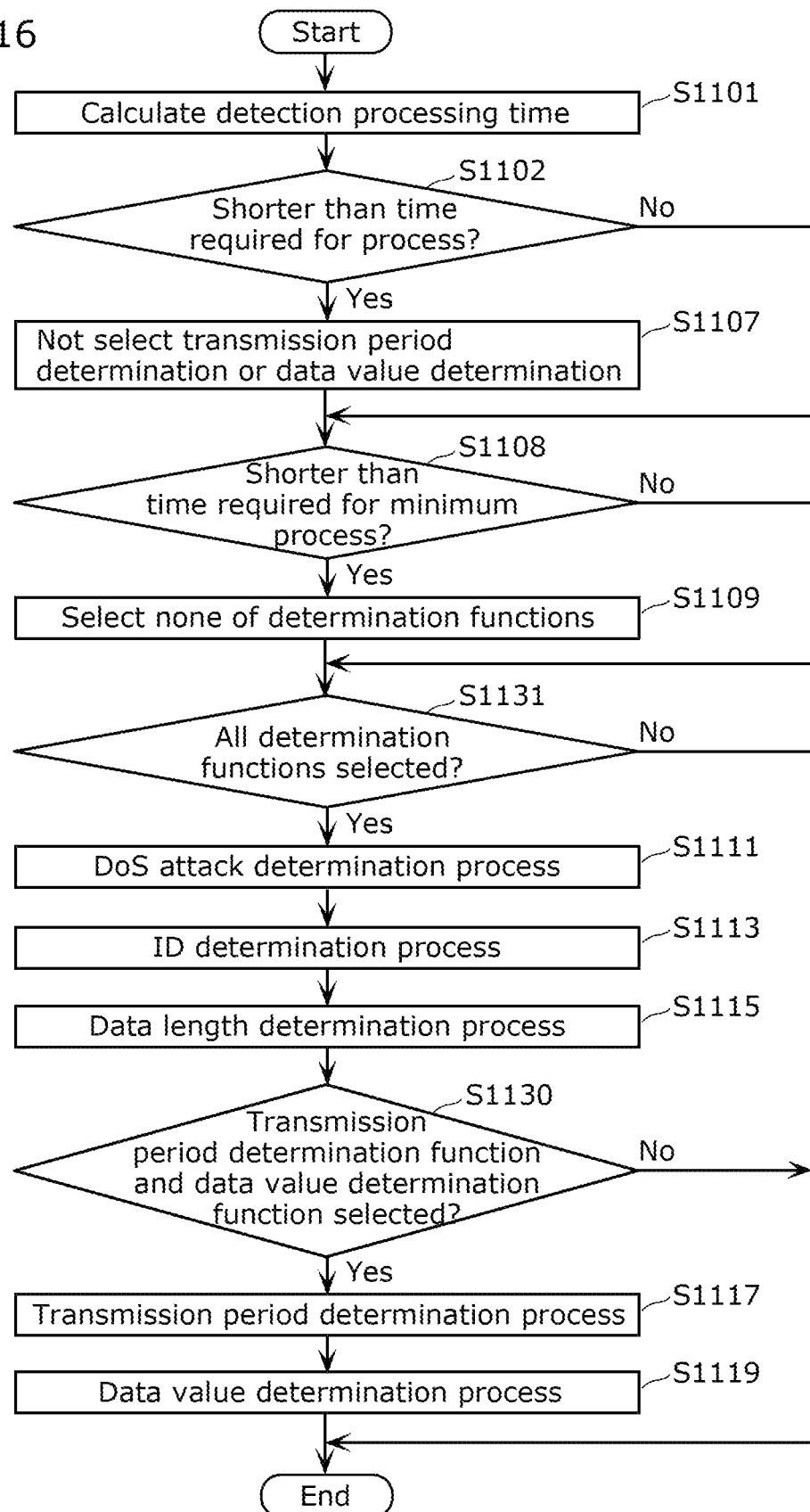
FIG. 16 is a flowchart illustrating another example of an anomaly detection process according to Embodiment 1.

FIG. 16 is a flowchart illustrating another example of the anomaly detection process according to Embodiment 1.

Note that in the case where determination function selector 371 not only selects whether or not to perform the transmission period determination function and the data value determination function, but also selects an option to perform none of the determination functions, the processes performed in Step S1108 and Step S1109 in FIG. 16 are included between the process performed in Step S1107 in FIG. 15 and the process performed in Step S1131.

Next, determination function selector 371 determines whether or not the detection processing time calculated in Step S1101 is longer than the time required for the anomaly detection process related to the DoS attack determination function, the ID determination function, and the data length determination function (Step S1108).

When determination function selector 371 determines that the detection processing time is shorter than the required time mentioned above, determination function selector 371 selects none of the determination functions (Step S1109).

Subsequently, controller 372 determines whether or not determination function selector 371 has selected all the determination functions (Step S1131). Specifically, controller 372 determines whether or not determination function selector 371 has avoided selecting the DoS attack determination function, the ID determination function, or the data length determination function.

When controller 372 determines that determination function selector 371 has selected the DoS attack determination function, the ID determination function, and the data length determination function (Yes in Step S1131), controller 372 performs the DoS attack determination function of anomaly detector 373 (Step S1111).

Subsequently, controller 372 performs the ID determination function of anomaly detector 373 (Step S1113).

Furthermore, controller 372 performs the data length determination function of anomaly detector 373 (Step S1115).

The subsequent processes related to the transmission period determination function and the data value determination function are substantially the same as the processes illustrated in FIG. 15, and therefore description thereof will be omitted.

When controller 372 determines that determination function selector 371 has not selected the DoS attack determination function, the ID determination function, and the data length determination function (No in Step S1131), controller 372 does not perform the determination functions of anomaly detector 373.

The anomaly detection process related to five determination functions, namely, the DoS attack determination, the ID determination, the data length determination, the transmission period determination, and the data value determination has so far been described as the process illustrated in FIG. 16, but the process illustrated in FIG. 16 may further include an anomaly detection process related to the transmission frequency determination and the vehicle status determination. Furthermore, the process illustrated in FIG. 16 may be a combination of some of the above determination functions or may include another determination function. The process illustrated in FIG. 16 has so far been described as including separate processes in which whether or not the DoS attack determination function, the ID determination function, and the data length determination function have been selected is determined and in which only the selection of whether or not to perform the transmission period determination function and the data value determination function is performed, but this is not limiting. It is sufficient that the process illustrated in FIG. 16 be a process in which controller 372 determines whether or not determination function selector 371 has selected all the determination functions, and according to the determination result, controller 372 controls the execution of the determination functions. With this, in the anomaly determination method according to the present embodiment, the anomaly determination can be performed even when there is not enough time for the anomaly detection process.

Note that the anomaly detection process of determination function selector 371 and controller 372 is not limited to the above example, but may be a combination of the above features.

Note that when determination function selector 371 determines that the detection processing time is shorter than the time required for the detection process (Step S1102), determination function selector 371 selects a determination function to be applied, but this is not limiting. Determination function selector 371 is not required to perform the determination process of Step S1102 and at the time of selecting a determination function to be applied, when the detection processing time is longer than the time required for the detection process, determination function selector 371 may select all the determination functions. This can simplify the processing of determination function selector 371.

Note that in the case where controller 372 performs each determination function, controller 372 refers to a detection rule which is set for each CAN ID. Controller 372 performs control so as to perform a determination function described in the detection rule and selected by determination function selector 371. This means that a determination function selected by determination function selector 371, but not described in the detection rule is not performed. When it is determined in Step S1102 that the calculated detection processing time is longer than the time required for the detection process, controller 372 performs the functions described in the detection rule assuming that determination function selector 371 has selected all the determination functions.

[1.10 Reset Process]

In the anomaly detection process, depending on the type of a determination function not selected when determination function selector 371 selects a function to be performed, there is a possibility that when the determination function is performed next, a determination result may be different from an ordinary one. For example, the transmission period determination function is based on the premise that in-vehicle network system 10 periodically receives messages; upon receipt of the last message, the receipt time (referred to as the last receipt time) is recorded, and whether or not a message received this time is an anomalous message is determined from a difference between the last receipt time and the current receipt time.

At this time, in the case where determination function selector 371 has not selected the transmission period determination function even when the message properly arrived, recording the last receipt time is unsuccessful, and thus the current receipt time is compared with the receipt time that is second to last, leading to the possibility of failing to perform normal determination. Especially, in the case where the transmission period determination function has not been selected in a row, segments in which no receipt time is recorded become long, and thus the likelihood of failing to perform normal determination increases. Such concerns also apply to the data value determination function in which whether the message is normal or anomalous is determined from the amount of change between the last data value and the current data value.

Thus, when a certain determination function has not been selected by determination function selector 371 and the process of said determination function has been skipped, a reset process needs to be performed on said determination function before the next execution of said determination function so as to avoid an unexpected determination result. Particularly, for a function involving determination based on comparison between the last value and the current value, such as the transmission period determination function or the data value determination function in which the amount of change in data is determined, or a function involving cumulative calculation, such as the transmission frequency determination function, there is a need to perform the reset process to clear the last value or the cumulative value when the function has not been selected by determination function selector 371 and the process of said function has been skipped.

Figure 17:
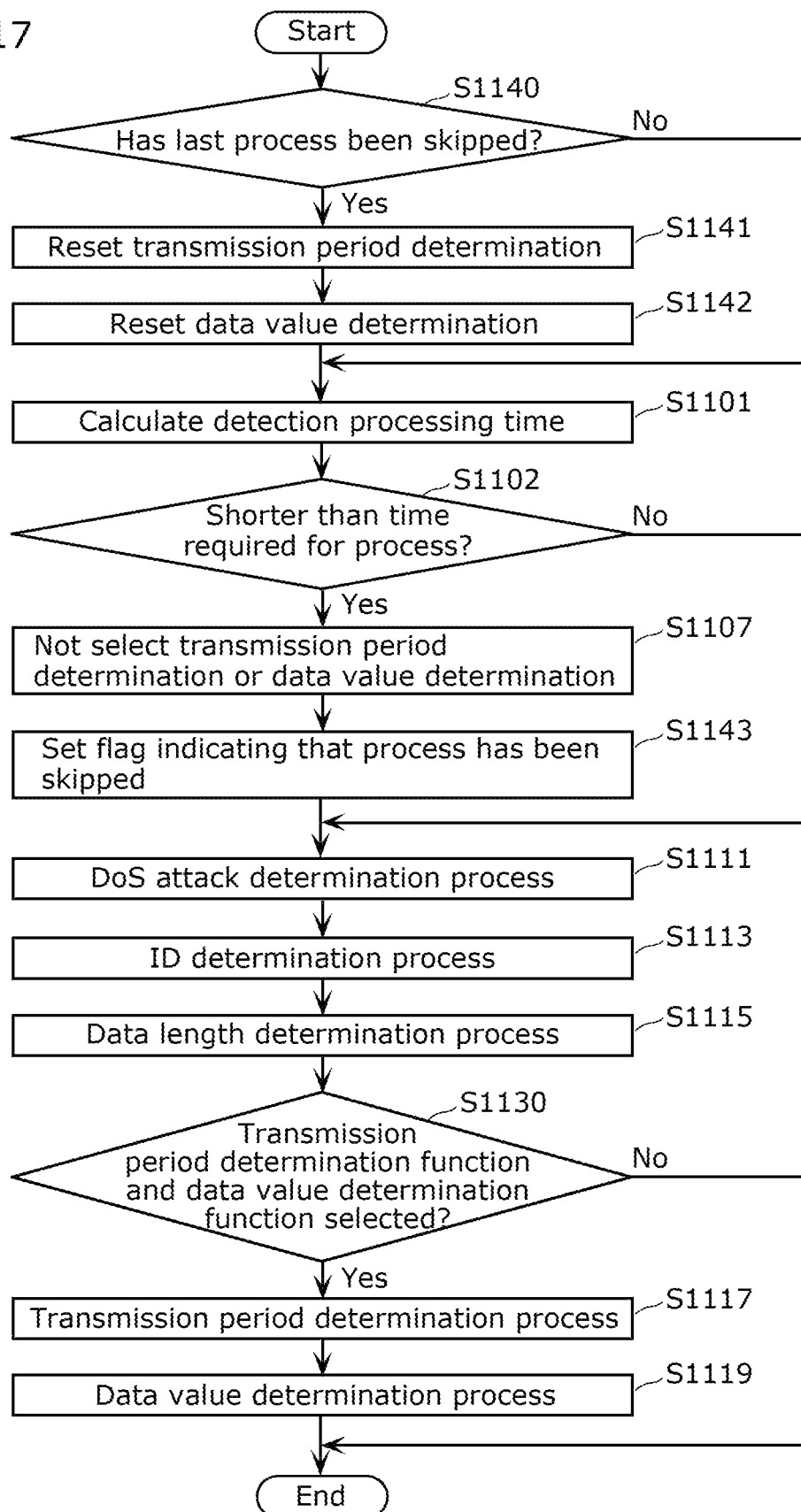
FIG. 17 is a flowchart illustrating one example of an anomaly detection process including a reset process according to Embodiment 1.
Figure 18:
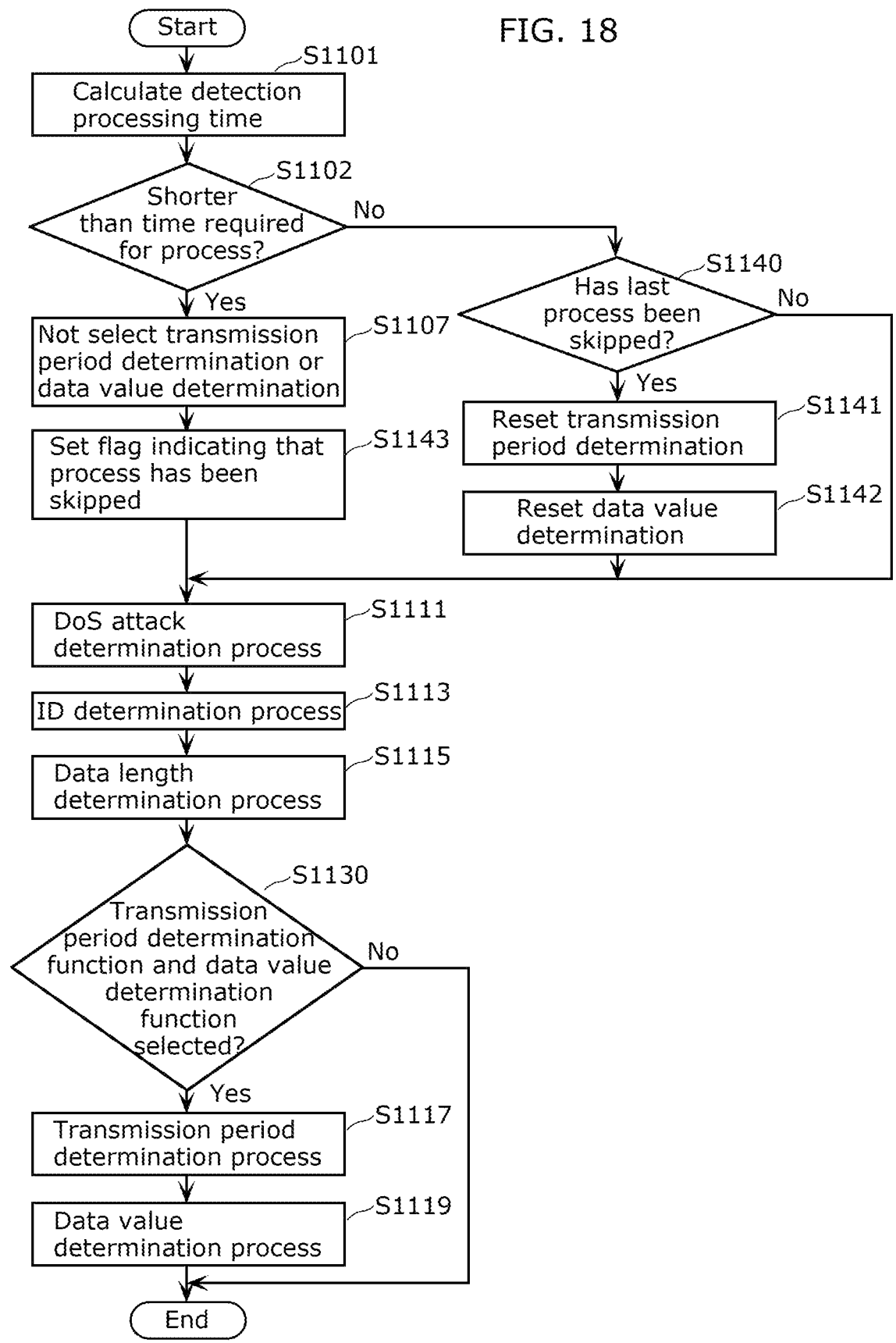
FIG. 18 is a flowchart illustrating another example of an anomaly detection process including a reset process according to Embodiment 1.
Figure 19:
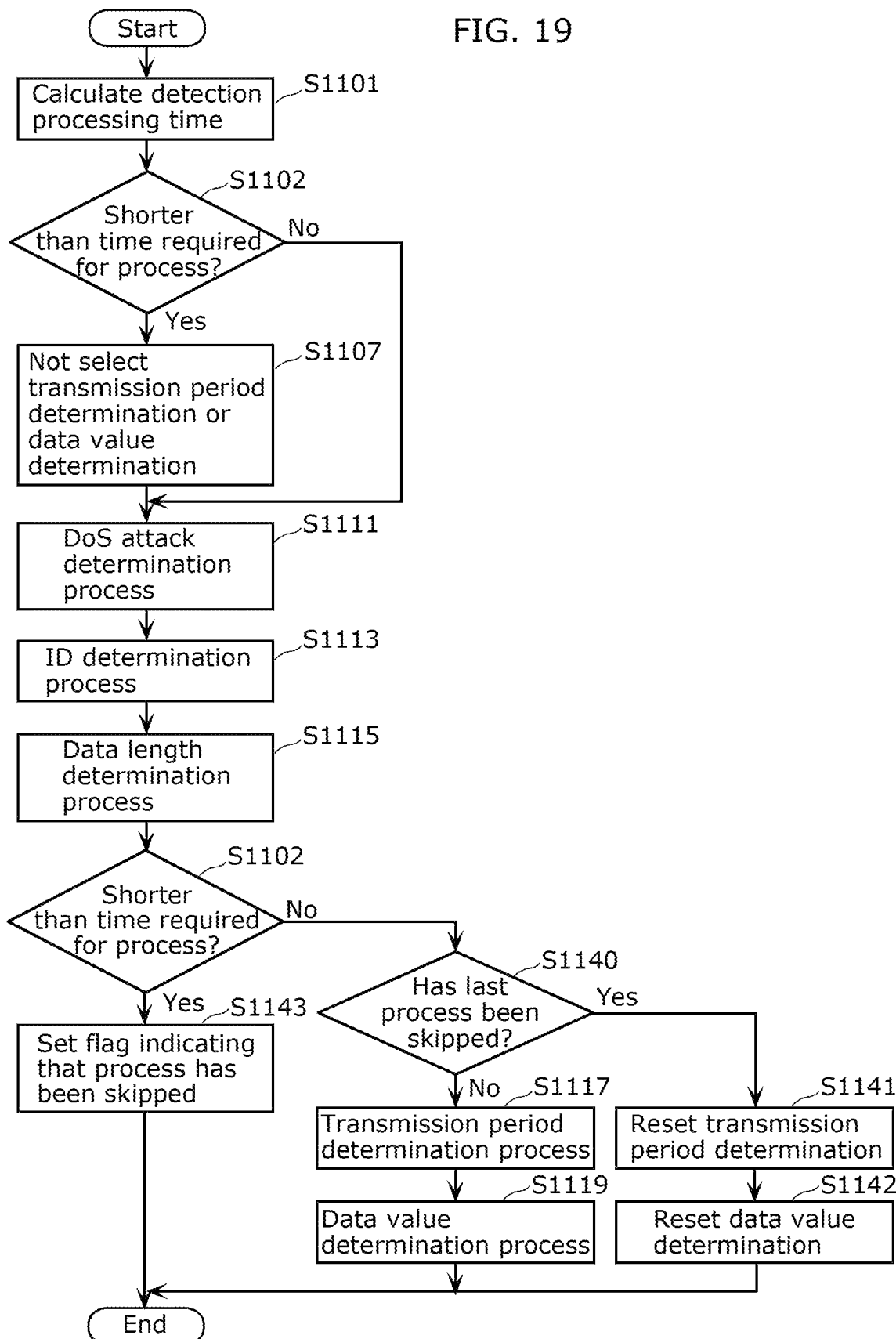
FIG. 19 is a flowchart illustrating yet another example of an anomaly detection process including a reset process according to Embodiment 1.

FIG. 17 is a flowchart illustrating one example of the anomaly detection process including the reset process according to Embodiment 1. FIG. 18 is a flowchart illustrating another example of the anomaly detection process including the reset process according to Embodiment 1. FIG. 19 is a flowchart illustrating yet another example of the anomaly detection process including the reset process according to Embodiment 1. These flowchart include the reset process in addition to the anomaly detection process in FIG. 15 in which determination function selector 371 selects only whether or not to perform the transmission period determination function and the data value determination function. Therefore, description of the same processing as that illustrated in FIG. 15 other than the reset process will be omitted.

First, determination function selector 371 checks a flag indicating that the processes of the transmission period determination function and the data value determination function have been skipped, to determine whether or not the last process has been skipped (Step S1140).

When determination function selector 371 determines that the last process has been skipped (Yes in Step S1140), determination function selector 371 requests controller 372 to perform the reset process on the transmission period determination function and the data value determination function.

Controller 372 receives the request from determination function selector 371 and performs the reset process on the transmission period determination function (Step S1141).

Next, controller 372 performs the reset process on the data value determination function (Step S1142).

Furthermore, after Step S1101 and Step S1102, determination function selector 371 performs the process of not selecting the transmission period determination function or the data value determination function in Step S1107 and then sets a flag indicating that the processes of the transmission period determination function and the data value determination function have been skipped (Step S1143). Here, the flag indicating that the processes of the transmission period determination function and the data value determination function have been skipped is set for each CAN ID.

Note that as the reset process, for example, when a determination function is performed for the first time after the last value stored is cleared, the resultant value may be stored as the last value, or a message determined as being normal for the first time by a determination function that does not have the last value may be stored as the last value.

Here, in the case where the last value is stored for each CAN ID, the first receipt of a message having the same CAN ID as that of a message whose last value has been cleared is regarded as the first execution of the determination function, or when a determination function that does not have the last value for a message having the same CAN ID as that of a message whose last value has been cleared determines the received message as being normal for the first time, the resultant value is stored as the last value. It is also possible to determine whether or not to store the resultant value as the last value using a message having a different CAN ID as a criterion instead of a message having the same CAN ID.

For example, a message having a proper message authentication code (MAC) may be used as a criterion to determine whether or not to store the resultant value as the last value, or a message having a different CAN ID with a similar transmission period or the same transmission period may be used as a criterion to determine whether or not to store the resultant value as the last value.

Figure 20:
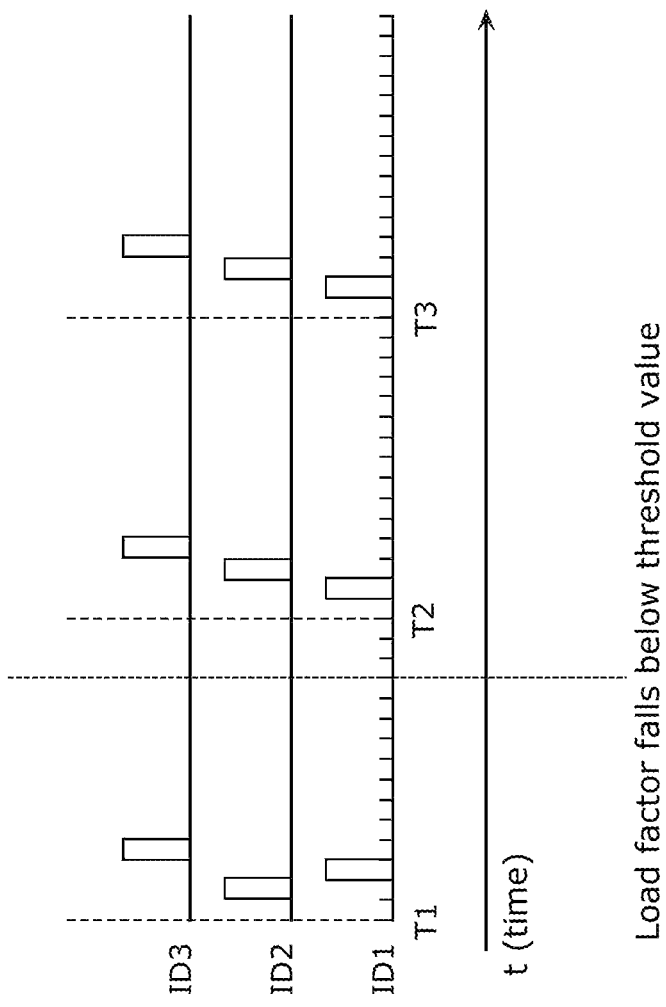
FIG. 20 is a diagram illustrating one example of a reset process according to a variation.

FIG. 20 is a diagram illustrating one example of the reset process according to a variation. FIG. 20 shows an example of a message having a different CAN ID with the same transmission period. For example, in the anomaly determination method according to the present disclosure, in the case where the load factor falls below the threshold value immediately before time T2, when messages having ID1, ID2, ID3 are received almost at the same time, the receipt time of the messages having ID1, ID2, ID3 are stored as the last values. Furthermore, in the anomaly determination method according to the present disclosure, the cumulative value that has been stored may be initialized, or the vehicle status that has been held may be initialized. This makes it possible to increase the accuracy of the determination performed by the determination function after the reset process.

Note that in the anomaly determination method according to the present disclosure, the reset process is performed on the transmission period determination function and the data value determination function, but this is not limiting; the reset process may be performed on another determination function having the last value, or the reset process may be performed on the transmission frequency determination function, the vehicle status determination function, or the like in which the cumulative value or the vehicle status is stored. Furthermore, the timing of the reset process is not required to be the timing illustrated in FIG. 17 and may be, for example, the timing illustrated in FIG. 18, FIG. 19, or the like.

The processing illustrated in FIG. 17 to FIG. 19 is configured by adding the reset process to the flowchart illustrated in FIG. 15, but this is not limiting; the reset process may be added to another anomaly detection process flowchart (for example, the flowcharts illustrated in FIG. 12 to FIG. 14, FIG. 16, and FIG. 21 onward). Furthermore, the timing of the reset process may vary for each CAN ID. Thus, in the anomaly determination method according to the embodiment of the present disclosure, the reset process can be performed with proper timing according to information that has been stored.

Note that when determination function selector 371 does not select the transmission period determination function and the data value determination function, determination function selector 371 sets a flag indicating that the processes have been skipped, but this is not limiting. For example, determination function selector 371 may refer to the detection rule which is set for each CAN ID, and in the case where a determination function that is not selected by determination function selector 371 is not performed according to the detection rule, determination function selector 371 is not required to set a flag indicating that the process has been skipped, and even when determination function selector 371 sets a flag indicating that the process has been skipped, there is no need to perform the reset process during the reset process. This makes it possible to reduce unnecessary reset processes, reduce the processing time, or prevent the detection performance from degrading due to the reset process.

[1.11 Advantageous Effects]

In the present embodiment, according to time available for the anomaly detection process (detection processing time), anomaly detection process functional group 370 selects a determination function to be performed, and thus even when the detection processing time is short, it is possible to select a combination of determination functions that can produce significantly advantageous anomaly detection effects in accordance with the detection processing time. Furthermore, by performing the reset process on some or all of the determination functions, it is possible to alleviate adverse effects that are produced as a result of not performing the determination functions, and thus the anomaly detection performance can be further improved.

Embodiment 2

[2. Outline]

In Embodiment 1, in anomaly detection process functional group 370, determination function selector 371 selects a determination function to be applied, and controller 372 controls the execution of each determination function according to the result of selection by determination function selector 371. The present embodiment describes, with reference to the drawings, the case where in the in-vehicle network system, in accordance with the detection processing time, controller 372 determines which of the determination functions is to be performed.

[2.1 Configuration of Anomaly Detection Process Functional Group]

Figure 21:
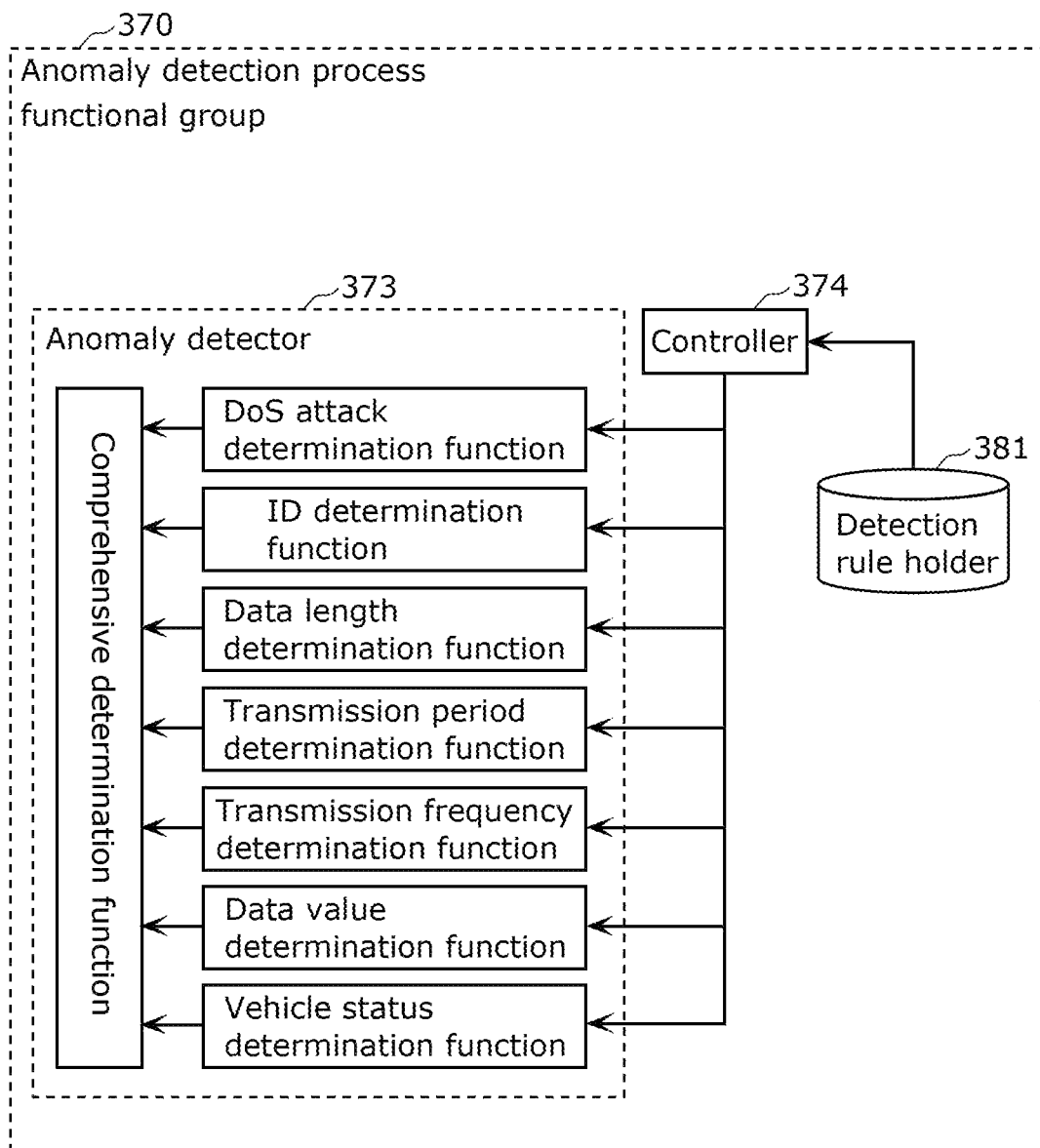
FIG. 21 is a block diagram illustrating one example of an anomaly detection process functional group according to Embodiment 2.

FIG. 21 is a block diagram illustrating one example of an anomaly detection process functional group according to Embodiment 2. In FIG. 21, anomaly detection process functional group 370 includes controller 374 and anomaly detector 373. Note that description of structural elements that are the same as those in Embodiment 1 will be omitted.

Note that these elements represent functions and are implemented by the processor reading and executing a program held in the storage, and storing predetermined data into the storage, or transmitting and receiving data via the input/output unit, in gateway 300, or are implemented by a combination of these processes.

Controller 374 determines, among the determination functions of anomaly detector 373, a determination function that is applicable within the detection processing time, and controls the execution of the determination function. Controller 374 calculates available time for the anomaly detection process of anomaly detector 373 (detection processing time), and controls the execution of the determination function so as not to exceed the detection processing time.

For example, similarly to determination function selector 371 in Embodiment 1, controller 374 holds data on the processing time for each determination function and the detection performance (for example, the rate of false detection and the rate of detection) such as those illustrated in FIG. 7, obtains a combination of determination functions that can be performed within the calculated detection processing time, and performs control to execute only these determination functions. At this time, if there is more than one combination of determination functions that can be performed within the calculated detection processing time, a combination of determination functions having the best detection performance (for example, a combination that is low in the rate of false detection and high in the rate of detection) is performed.

Note that controller 374 calculates the detection processing time, but this is not limiting. Anomaly detection process functional group 370 may include a processing time calculator that calculate detection processing time, and controller 374 may obtain the processing time from the processing time calculator and select a determination function, or anomaly detection process functional group 370 may obtain information about the detection processing time from frame processor 350 and select, on the basis of the obtained information, a determination function to be performed. Thus, it is sufficient that controller 374 manage only the processing time related to the anomaly detection process, meaning that the anomaly detection process can be loosely coupled to other functions, and it is possible to reduce the impact that other functions have on the anomaly detection process.

[2.2 Anomaly Detection Process]

Figure 22:
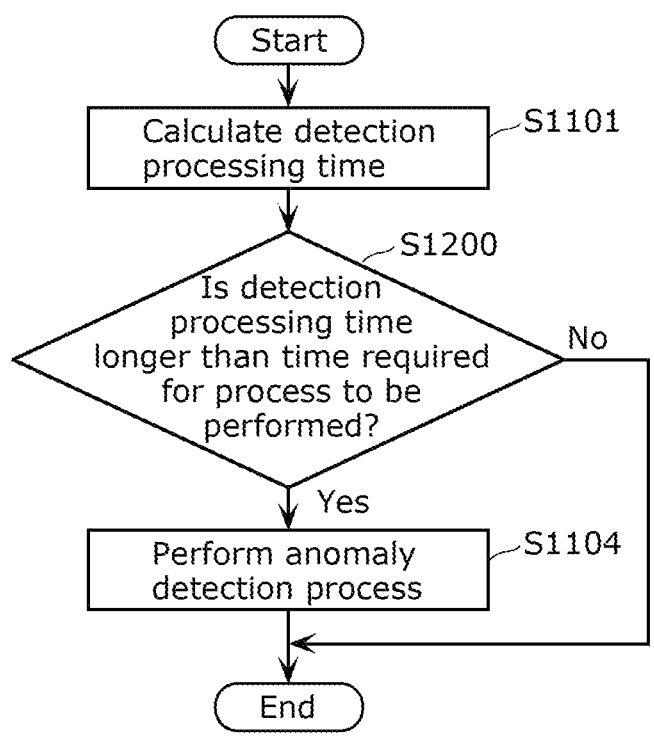
FIG. 22 is a flowchart illustrating one example of an anomaly detection process according to Embodiment 2.

FIG. 22 is a flowchart illustrating one example of the anomaly detection process according to Embodiment 2.

First, in response to the request for the anomaly detection process from frame processor 350, anomaly detection process functional group 370 calculates available time for the anomaly detection process (detection processing time) (Step S1101).

Next, controller 374 determines whether or not the detection processing time calculated in Step S1101 is longer than the time required for the detection process to be performed (Step S1200).

When controller 374 determines in Step S1200 that the detection processing time is longer than the time required for the detection process to be performed (Yes in Step S1200), controller 374 performs the anomaly detection processes (Step S1104).

Figure 23:
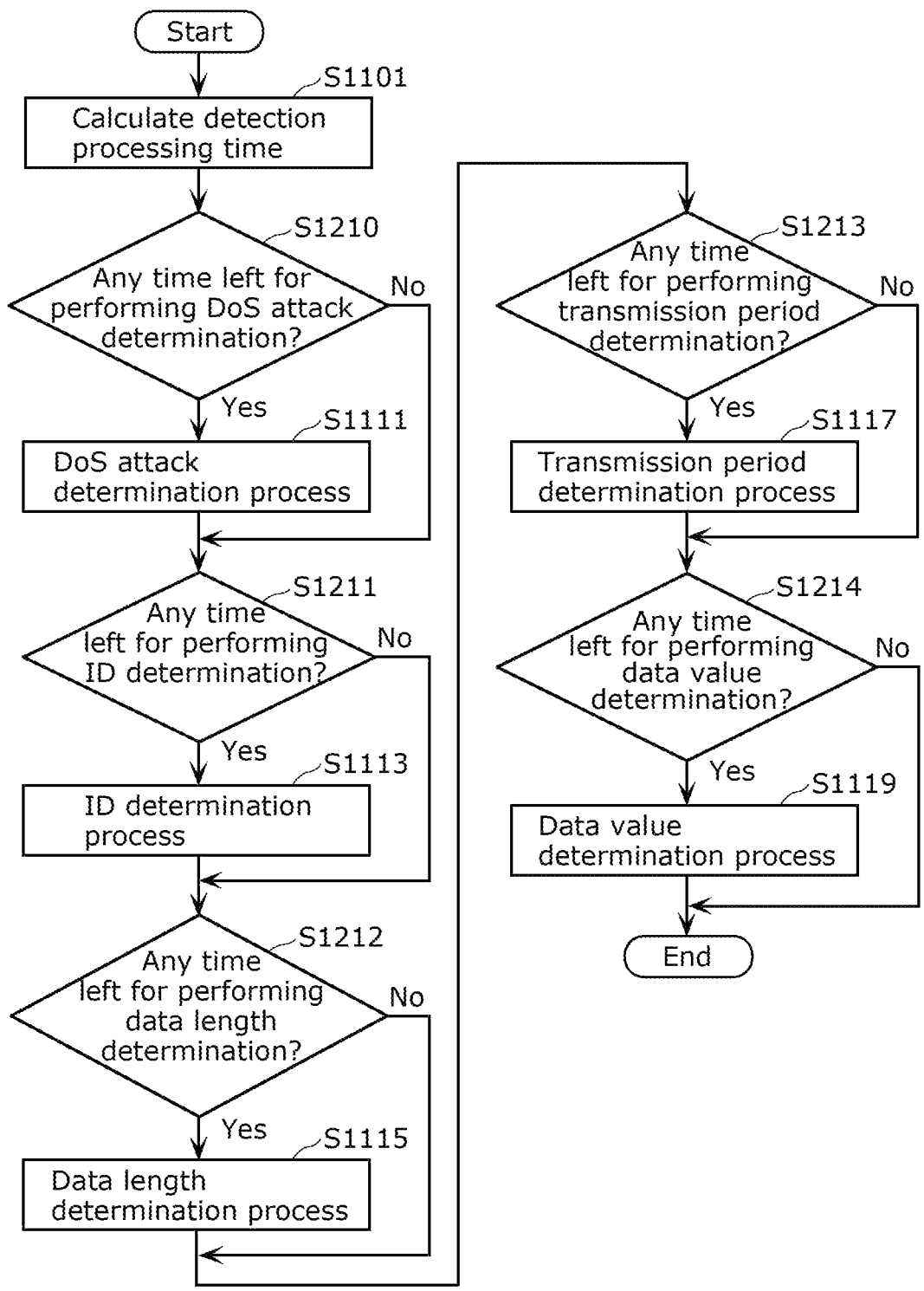
FIG. 23 is a flowchart illustrating another example of an anomaly detection process according to Embodiment 2.
Figure 24:
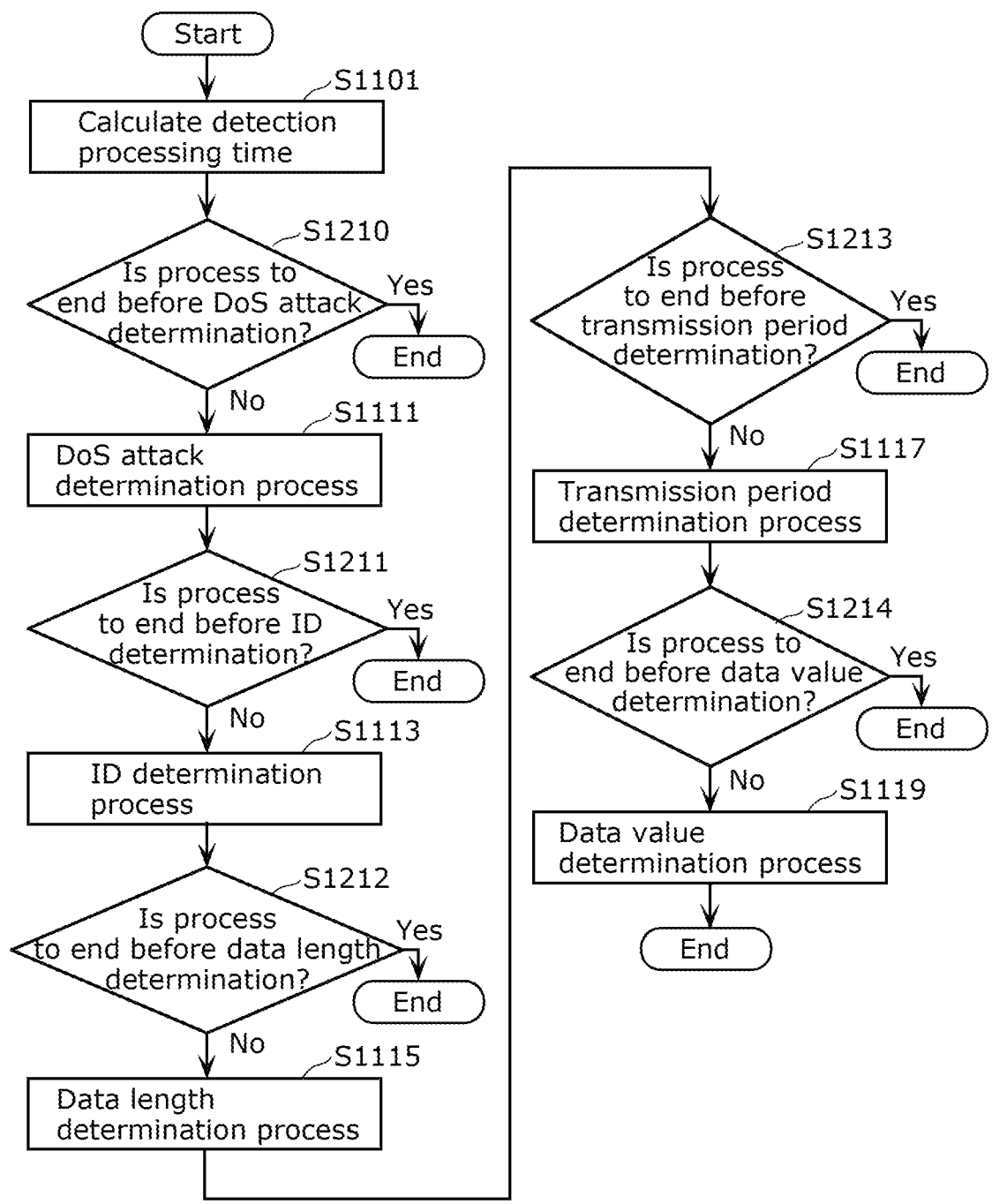
FIG. 24 is a flowchart illustrating yet another example of an anomaly detection process according to Embodiment 2.

Note that in the case where controller 374 individually controls the determination function to be performed, a step in FIG. 22 in which the anomaly detection process is performed (Step S1104) becomes the process illustrated in FIG. 23. FIG. 23 is a flowchart illustrating another example of the anomaly detection process according to Embodiment 2. FIG. 24 is a flowchart illustrating yet another example of the anomaly detection process according to Embodiment 2.

After calculating the detection processing time in Step S1101, controller 374 determines whether or not there is time to perform the DoS attack determination function (Step S1210).

When controller 374 determines that there is time to perform the DoS attack determination function (Yes in Step S1210), controller 374 performs the DoS attack determination function of anomaly detector 373 (S1111).

When controller 374 determines that there is not enough time to perform the DoS attack determination function (No in Step S1210), controller 374 does not perform the DoS attack determination function of anomaly detector 373.

Subsequently, on the basis of the detection processing time left after the DoS attack determination function is performed, controller 374 determines whether or not there is time to perform the ID determination function (Step S1211).

When controller 374 determines that there is time to perform the ID determination function (Yes in Step S1211), controller 374 performs the ID determination function of anomaly detector 373 (S1113).

When controller 374 determines that there is not enough time to perform the ID determination function (No in Step S1211), controller 374 does not perform the ID determination function of anomaly detector 373.

Next, on the basis of the detection processing time left after the ID determination function is performed, controller 374 determines whether or not there is time to perform the data length determination function (Step S1212).

When controller 374 determines that there is time to perform the data length determination function (Yes in Step S1212), controller 374 performs the data length determination function of anomaly detector 373 (S1115).

When controller 374 determines that there is not enough time to perform the data length determination function (No in Step S1212), controller 374 does not perform the data length determination function of anomaly detector 373.

Furthermore, on the basis of the detection processing time left after the data length determination function is performed, controller 374 determines whether or not there is time to perform the transmission period determination function (Step S1213).

When controller 374 determines that there is time to perform the transmission period determination function (Yes in Step S1213), controller 374 performs the transmission period determination function of anomaly detector 373 (S1117).

When controller 374 determines that there is not enough time to perform the transmission period determination function (No in Step S1213), controller 374 does not perform the transmission period determination function of anomaly detector 373.

Subsequently, on the basis of the detection processing time left after the transmission period determination function is performed, controller 374 determines whether or not there is time to perform the data value determination function (Step S1214).

When controller 374 determines that there is time to perform the data value determination function (Yes in Step S1214), controller 374 performs the data value determination function of anomaly detector 373 (S1119).

When controller 374 determines that there is not enough time to perform the data value determination function (No in Step S1214), controller 374 does not perform the data value determination function of anomaly detector 373. Thus, with the anomaly determination method according to the present disclosure, it is possible to flexibly control selection of the determination function to be performed.

Note that in the case where controller 374 determines the range of determination functions to be performed, the processing in the flowchart illustrated in FIG. 14 according to Embodiment 1 becomes the processing in the flowchart illustrated in FIG. 24. This eliminates the need to check, for each and every determination function, whether or not the determination function has been selected, and thus the processing time for checking can be reduced.

Figure 25:
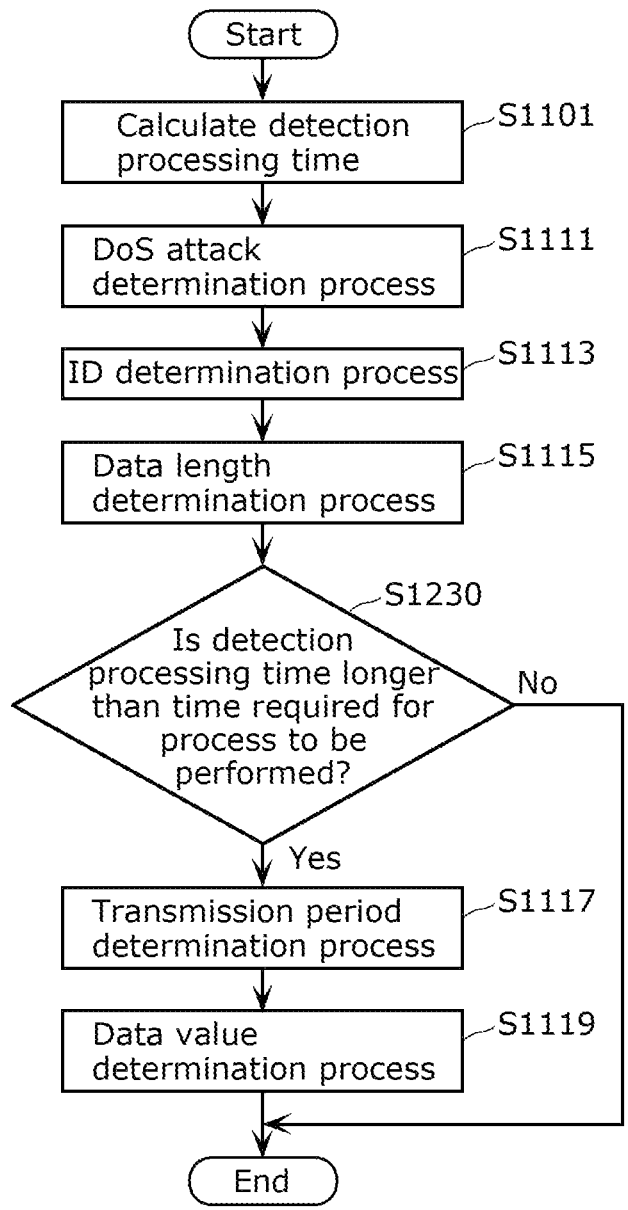
FIG. 25 is a flowchart illustrating another example of an anomaly detection process according to Embodiment 2.

Furthermore, in the case where controller 374 determines only whether or not to perform the transmission period determination function and the data value determination function, the processing in the flowchart illustrated in FIG. 15 according to Embodiment 1 becomes the processing in the flowchart illustrated in FIG. 25. FIG. 25 is a flowchart illustrating another example of the anomaly detection process according to Embodiment 2.

First, in response to the request for the anomaly detection process from frame processor 350, anomaly detection process functional group 370 calculates available time for the anomaly detection process (detection processing time) (Step S1101).

Next, controller 374 performs the DoS attack determination function of anomaly detector 373 (Step S1111).

Subsequently, controller 374 performs the ID determination function of anomaly detector 373 (Step S1113).

Furthermore, controller 374 performs the data length determination function of anomaly detector 373 (Step S1115).

Next, controller 374 determines whether or not the detection processing time is longer than the time required for the process to be performed (Step S1230).

Subsequently, when controller 374 determines that the detection processing time is longer than the time required for the process to be performed (Yes in Step S1230), controller 374 performs the transmission period determination function of anomaly detector 373 (Step S1117).

Furthermore, when controller 374 determines that the detection processing time is longer than the time required for the process to be performed (Yes in Step S1230), controller 374 performs the data value determination function of anomaly detector 373 (Step S1119).

When controller 374 determines that the detection processing time is shorter than the time required for the process to be performed (No in Step S1230), controller 374 ends the operation.

Figure 26:
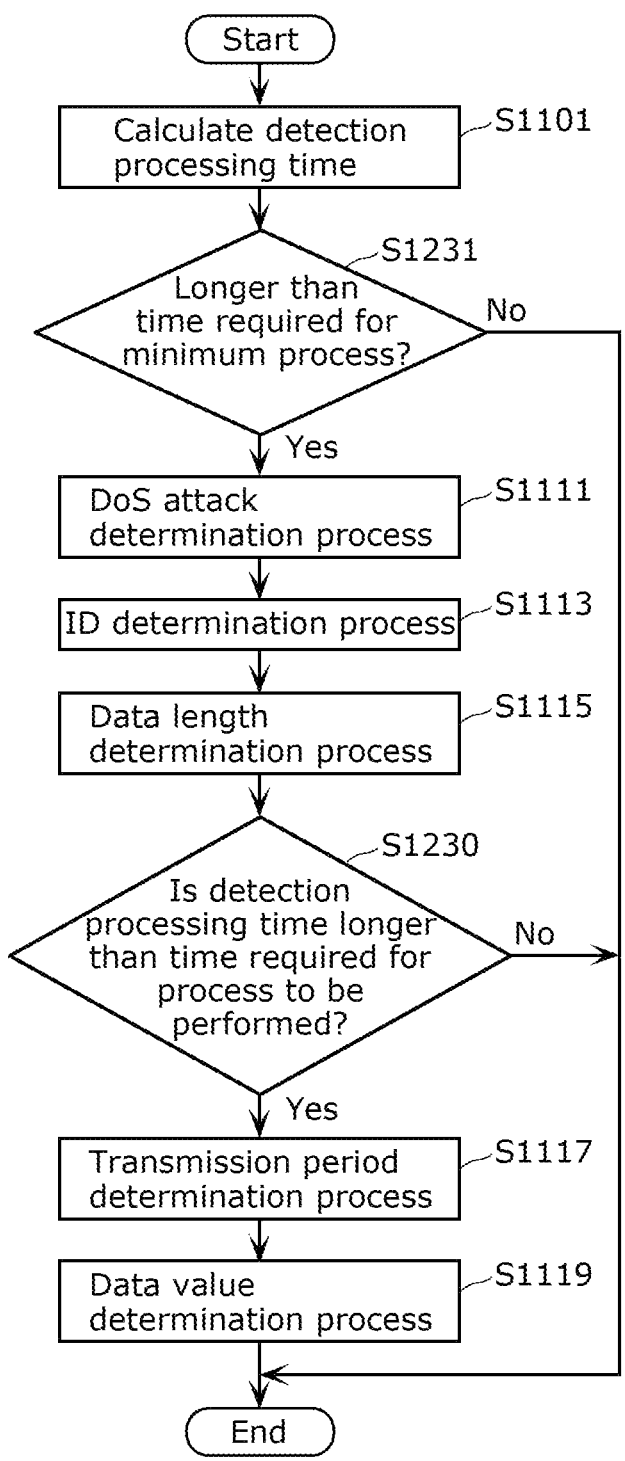
FIG. 26 is a flowchart illustrating yet another example of an anomaly detection process according to Embodiment 2.

Thus, in the case where a combination of processes to be performed can be determined in advance at the time of designing or the like, it is possible to collectively check whether or not the determination functions have been selected, allowing a reduction in processing time. Furthermore, in the case where controller 374 not only determines whether or not to perform the transmission period determination function and the data value determination function, but also determines that all the determination functions are not to be performed, the processing in the flowchart illustrated in FIG. 16 according to Embodiment 1 becomes the processing in the flowchart illustrated in FIG. 26. FIG. 26 is a flowchart illustrating yet another example of the anomaly detection process according to Embodiment 2. With this, the anomaly determination method according to the present disclosure is applicable even in the case where there is not enough time to perform the anomaly detection process.

First, in response to the request for the anomaly detection process from frame processor 350, anomaly detection process functional group 370 calculates available time for the anomaly detection process (detection processing time) (Step S1101).

Subsequently, controller 374 determines whether or not the detection processing time is longer than the time required for the minimum process which controller 374 performs (Step S1231).

Next, when controller 374 determines that the detection processing time is longer than the time required for the minimum process which controller 374 performs (Yes in Step S1231), controller 374 performs the DoS attack determination function of anomaly detector 373 (Step S1111).

Subsequently, when controller 374 determines that the detection processing time is longer than the time required for the minimum process which controller 374 performs (Yes in Step S1231), controller 374 performs the ID determination function of anomaly detector 373 (Step S1113).

Furthermore, when controller 374 determines that the detection processing time is longer than the time required for the minimum process which controller 374 performs (Yes in Step S1231), controller 374 performs the data length determination function of anomaly detector 373 (Step S1115).

Next, controller 374 determines whether or not the detection processing time is longer than the time required for the process to be performed (Step S1230).

Subsequently, when controller 374 determines that the detection processing time is longer than the time required for the process to be performed (Yes in Step S1230), controller 374 performs the transmission period determination function of anomaly detector 373 (Step S1117).

Furthermore, when controller 374 determines that the detection processing time is longer than the time required for the process to be performed (Yes in Step S1230), controller 374 performs the data value determination function of anomaly detector 373 (Step S1119).

When controller 374 determines that the detection processing time is shorter than the time required for the minimum process which controller 374 performs (No in Step S1231), controller 374 ends the operation.

Furthermore, when controller 374 determines that the detection processing time is shorter than the time required for the process to be performed (No in Step S1230), controller 374 ends the operation.

Note that the foregoing describes the anomaly detection process related to five determination functions, namely, the DoS attack determination, the ID determination, the data length determination, the transmission period determination, and the data value determination, but the anomaly determination method according to the present disclosure may further include an anomaly detection process related to the transmission frequency determination and the vehicle status determination. Furthermore, the anomaly determination method according to the present disclosure may include a combination of some of the above processes or may include another determination function.

Note that the anomaly detection process which controller 374 performs is not limited to the above example, but may be a combination of the above features.

Note that the processes related to the DoS attack determination function, the ID determination function, the data length determination function, the transmission period determination function, and the data value determination function illustrated in FIG. 13 to FIG. 19 and FIG. 23 to FIG. 26 may be performed in a different order for each message ID.

[2.3 Reset Process]

In the anomaly detection process, depending on a determination function not performed when controller 374 determines whether or not to perform each determination function, there is a possibility that when the determination function is performed next, a determination result may be different from an ordinary one. Therefore, as in Embodiment 1, a reset process needs to be performed on a determination function determined by controller 374 as not being performed.

In Embodiment 1, when determination function selector 371 performs the process of selecting a determination function, a flag indicating that the process has been skipped is set. In Embodiment 2, when controller 374 determines that a determination function is not to be performed, it is necessary to set a flag indicating that the process has been skipped. Determination of whether or not to perform the reset process, which is performed by controller 374 in accordance with the flag indicating that the process has been skipped, is substantially the same as the processes illustrated in FIG. 17 to FIG. 19 according to Embodiment 1, and thus description thereof will be omitted.

[2.4 Advantageous Effects]

In the present embodiment, immediately before each determination function is performed, anomaly detection process functional group 370 determines whether or not to perform the determination function, and thus it is possible to accurately reflect the execution time of each determination function in the determination of whether or not to perform the determination function, making it possible to perform a combination of determination functions that can produce significantly advantageous anomaly detection effects.

Embodiment 3

[3. Outline]

In Embodiment 1, in anomaly detection process functional group 370, determination function selector 371 selects a determination function to be applied, and controller 372 controls the execution of each determination function according to the result of selection by determination function selector 371. The present embodiment describes, with reference to the drawings, the case where in the in-vehicle network system, when a determination function is not performed, a message at this time is stored, and when the detection processing time is long enough, the anomaly detection process for the message is performed later.

[3.1 Configuration of Anomaly Detection Process Functional Group]

Figure 27:
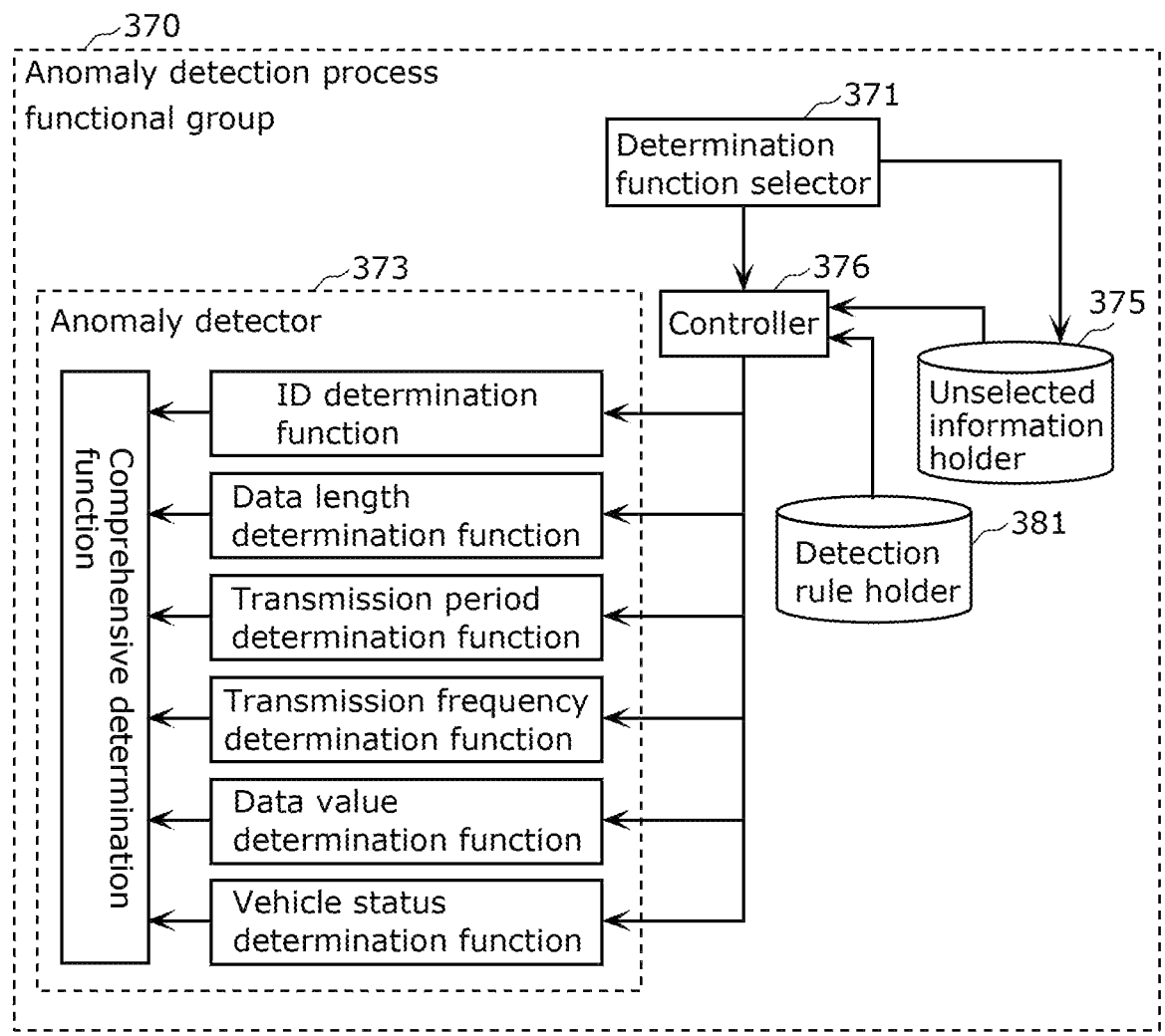
FIG. 27 is a block diagram illustrating one example of an anomaly detection process functional group according to Embodiment 3.
Figure 28:
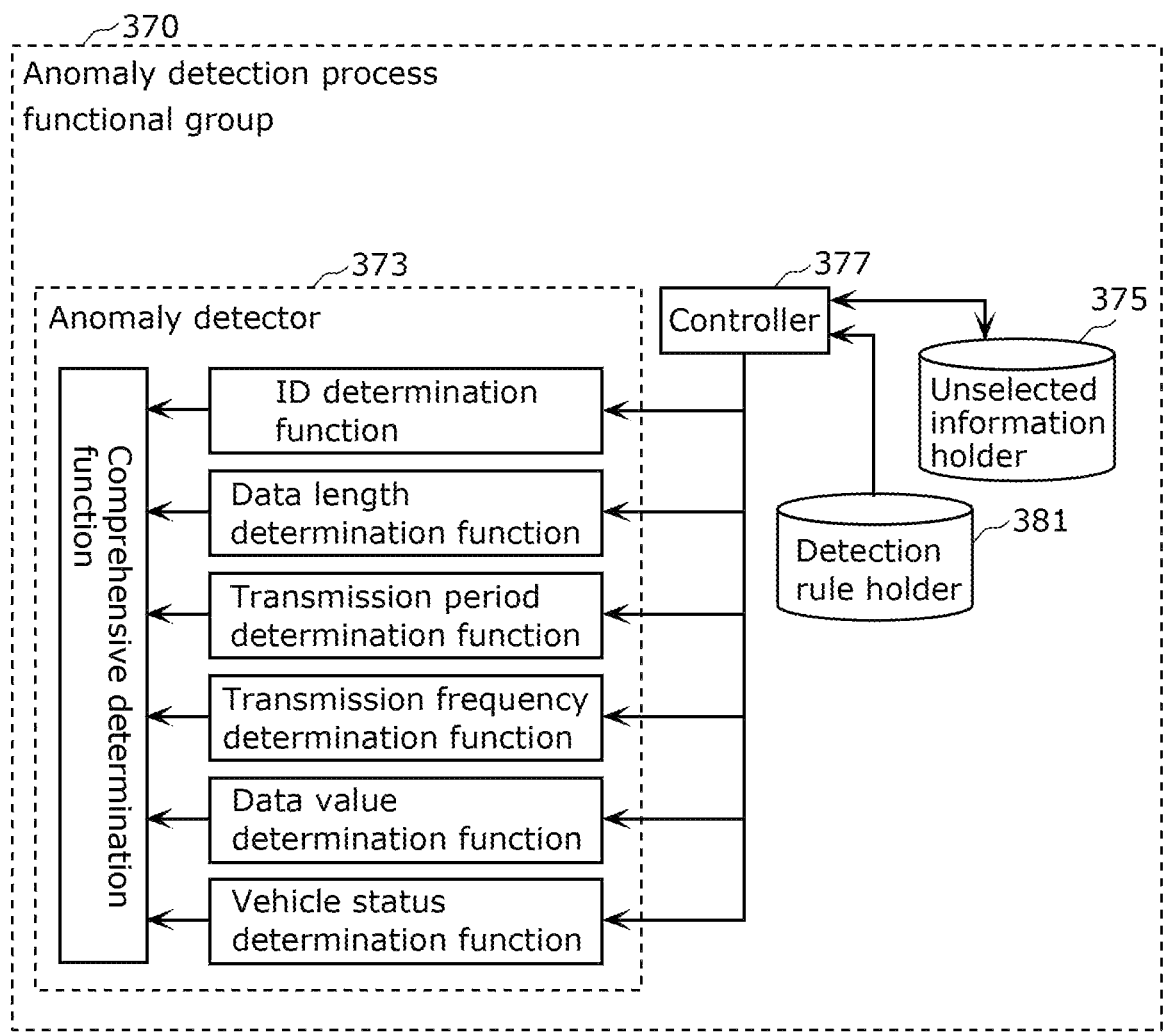
FIG. 28 is a block diagram illustrating another example of an anomaly detection process functional group according to Embodiment 3.

FIG. 27 is a block diagram illustrating one example of an anomaly detection process functional group according to Embodiment 3. In FIG. 27, anomaly detection process functional group 370 includes determination function selector 371, anomaly detector 373, unselected information holder 375, and controller 376. Alternatively, as illustrated in FIG. 28, anomaly detection process functional group 370 may include anomaly detector 373, unselected information holder 375, and controller 377, except determination function selector 371, similarly to Embodiment 2. FIG. 28 is a block diagram illustrating another example of the anomaly detection process functional group according to Embodiment 3. Note that description of structural elements that are the same as those in Embodiment 1 will be omitted.

Note that these elements represent functions and are implemented by the processor reading and executing a program held in the storage, and storing predetermined data into the storage, or transmitting and receiving data via the input/output unit, in gateway 300, or are implemented by performing a combination of these operations.

When some of the determination functions of anomaly detector 373 have not been performed, unselected information holder 375 sends and holds information of the received message.

Furthermore, unselected information holder 375 sends the held message to controller 376 in response to a request from controller 376.

In addition to the functions of controller 372 according to Embodiment 1, when it is determined that there is a determination function that has not been selected in the past processes, a message is held in unselected information holder 375, and there is enough time to perform the anomaly detection process on the message, controller 376 obtains the message from unselected information holder 375 and performs the anomaly detection process on the message.

Note that controller 377 has the same functions as controller 376 except that controller 377 includes the functions of controller 374 according to Embodiment 2 instead of the functions of controller 372 according to Embodiment 1.

Note that when some of the determination functions of anomaly detector 373 have not been performed, unselected information holder 375 may not only hold the received message, but also information about a determination function that has not been performed, as illustrated in FIG. 28, for example, so that at the time of execution of the anomaly detection process by controller 376, controller 377, etc., the anomaly detection process for only the determination function that has not been performed can be performed. FIG. 29 is a diagram illustrating one example of unselected information according to Embodiment 3. Thus, with the anomaly determination method according to the present disclosure, it is possible to perform only the necessary determination functions, allowing a reduction in processing time.

[3.2 Anomaly Detection Process]

Figure 30:
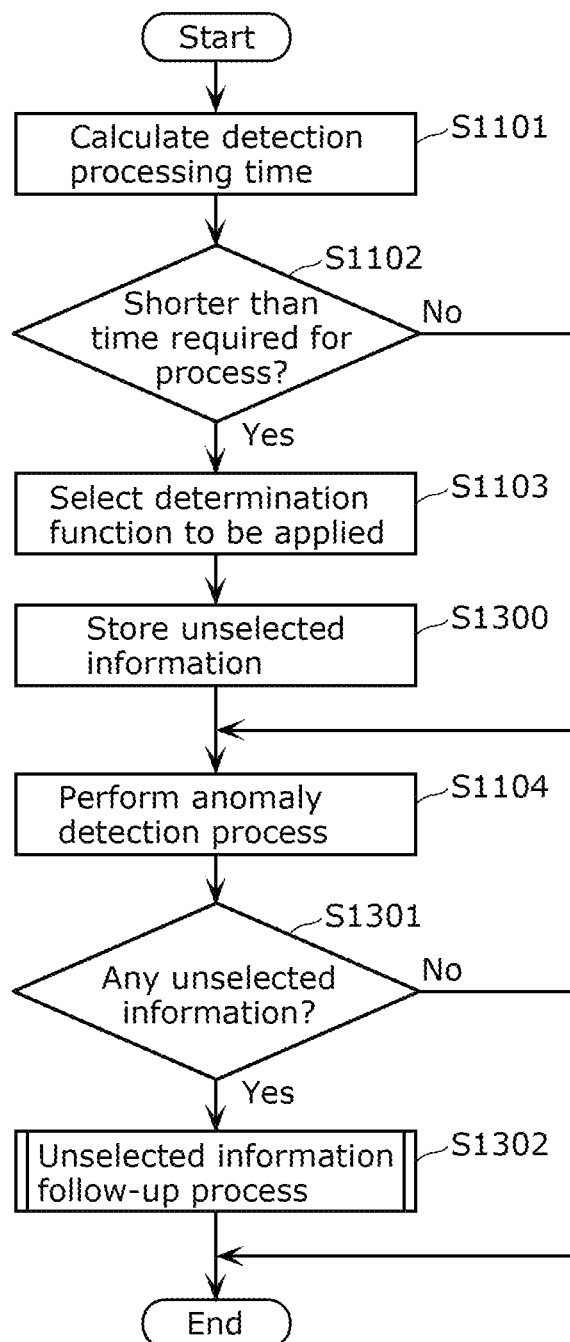
FIG. 30 is a flowchart illustrating one example of an anomaly detection process according to Embodiment 3.
Figure 31:
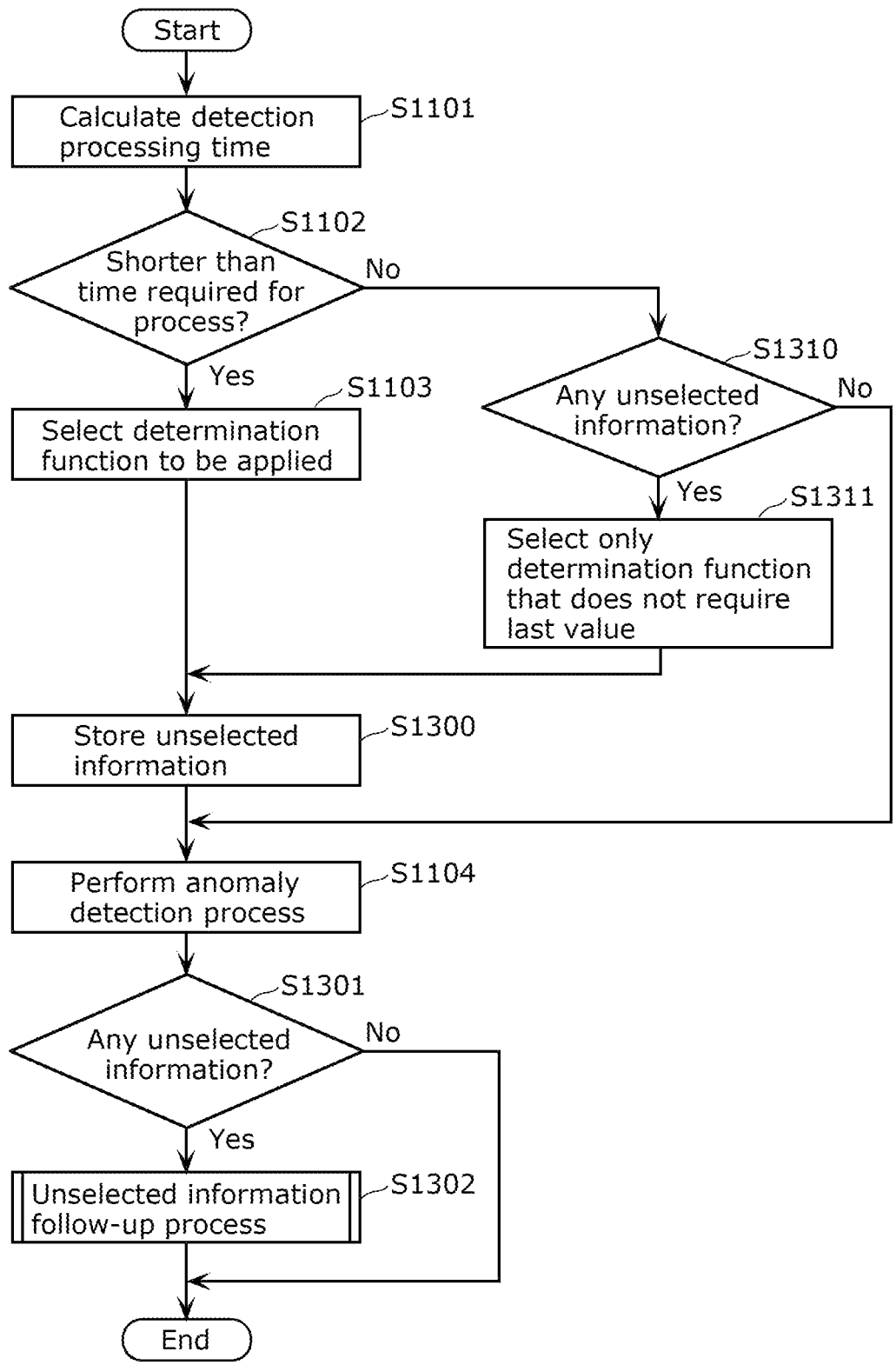
FIG. 31 is a flowchart illustrating another example of an anomaly detection process according to Embodiment 3.

FIG. 30 is a flowchart illustrating one example of the anomaly detection process according to Embodiment 3. FIG. 31 is a flowchart illustrating another example of the anomaly detection process according to Embodiment 3. When a certain determination function has not been performed in the anomaly detection process according to Embodiment 1 illustrated in FIG. 12, the message received at this point is stored (Step S1300). Furthermore, in the case where the detection processing time is long enough, the anomaly detection process for the message is performed later (Step S1302). Here, description of a process that is the same as the process illustrated in FIG. 12 will be omitted.

When the detection processing time is shorter than the time required for the determination process that is supposed to be performed, after the determination function to be applied is selected (after Step S1103), determination function selector 371 requests unselected information holder 375 to store information about the message. In response to the request from determination function selector 371, unselected information holder 375 stores the information about the message (Step S1300).

Subsequently, controller 376 performs the anomaly detection process and inquires, to unselected information holder 375, about whether or not there is unselected information, and determines whether or not there is unselected information (Step S1301).

When controller 376 determines that there is unselected information (Yes in Step S1301), controller 376 performs an unselected information follow-up process (Step S1302). The unselected information follow-up process will be described later.

When controller 376 determines that there is no unselected information (No in Step S1301), controller 376 ends the anomaly detection process.

Note that in the case where a message having the same CAN ID as the CAN ID of a message (received message) on which the anomaly detection process requested by frame processor 350 is to be performed is held in unselected information holder 375, if some of the determination functions include a process in which the last value is used, the anomaly detection process may not be properly performed. Therefore, in the case where a message having the same CAN ID as the CAN ID of the received message is held in unselected information holder 375, determination function selector 371 may avoid selecting a determination function including a process in which the last value is used, but, after the unselected information follow-up process for the message having the same CAN ID as the CAN ID of the received message is completed, perform the anomaly detection process with all the determination functions.

The above process is illustrated in FIG. 31.

When determination function selector 371 determines that the detection processing time is longer than the time required for the detection process (No in Step S1102), determination function selector 371 determines whether or not a message having the same CAN ID as the CAN ID of the received message is held in unselected information holder 375 (Step S1310).

When determination function selector 371 determines that a message having the same CAN ID as the CAN ID of the received message is held in unselected information holder 375 (Yes in Step S1310), determination function selector 371 selects only a determination function that does not require the last value (Step S1311).

Furthermore, determination function selector 371 stores the unselected information because some of the determination functions are skipped (Step S1300).

When determination function selector 371 determines that a message having the same CAN ID as the CAN ID of the received message is not held in unselected information holder 375 (No in Step S1310), controller 376 performs the anomaly detection process (Step S1104). Thus, when the unselected information follow-up process is completed, the status of each of the determination functions matches a status of when the process of selecting a determination function is not performed, and therefore it is no longer necessary to perform the reset process.

[3.3 Unselected Information Follow-up Process]

Figure 32:
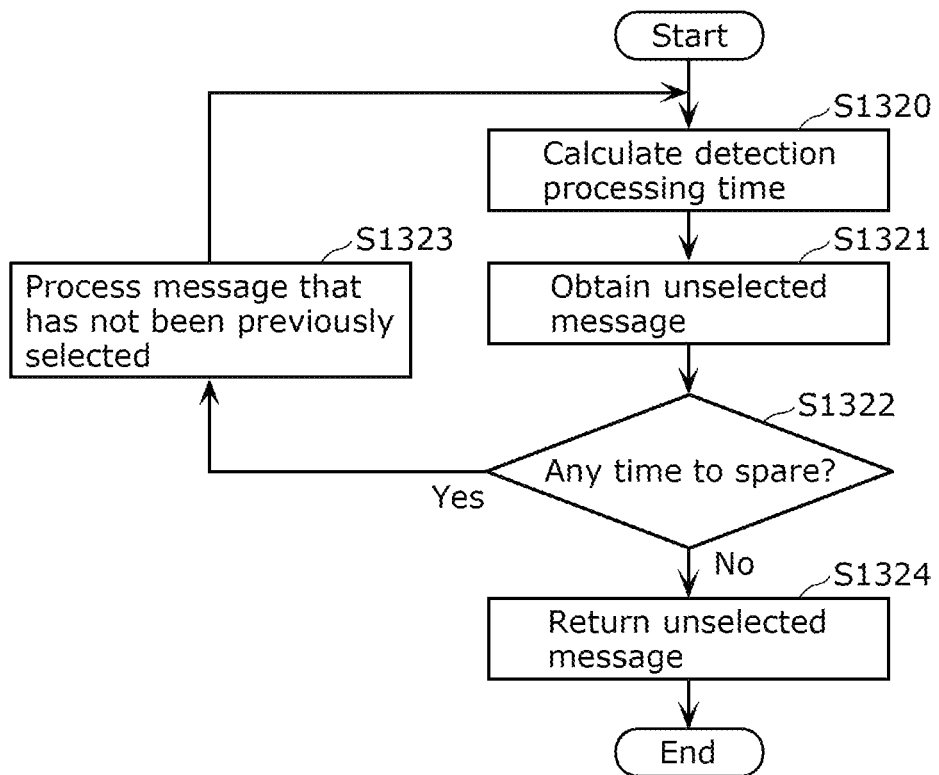
FIG. 32 is a flowchart illustrating one example of an unselected information follow-up process according to Embodiment 3.

FIG. 32 is a flowchart illustrating one example of the unselected information follow-up process according to Embodiment 3. With reference to FIG. 32, the aforementioned unselected information follow-up process will be described.

First, controller 376 calculates available time for the anomaly detection process for a message included in the unselected information (detection processing time) (Step S1320).

Next, controller 376 obtains one piece of the unselected information from unselected information holder 375 (Step S1321).

Subsequently, controller 376 calculates time required for the anomaly detection process for the message included in the obtained unselected information, and determines whether or not the calculated time is shorter than the detection processing time (Step S1322).

When controller 376 determines that the time required for the anomaly detection process for the message included in the obtained unselected information is shorter than the detection processing time and there is time to spare (Yes in Step S1322), controller 376 performs the anomaly detection process on the message included in the unselected information (Step S1323).

Subsequently, the processing returns to Step S1320.

When controller 376 determines that the time required for the anomaly detection process for the message included in the obtained unselected information is longer than the detection processing time and there is not enough time to spare (No in Step S1322), controller 376 returns the unselected information to unselected information holder 375 (Step S1324).

Here, controller 376 ends the unselected information follow-up process.

Note that in the case where the anomaly detection process is performed on the message included in the unselected information in Step S1323, controller 376 may perform only a determination function that has not been selected in the preceding anomaly detection process. In this case, in the determination in Step S1322 about whether or not there is time to spare, whether or not enough time is left to perform the process of a determination function that has not been selected in the preceding anomaly detection process is determined. Thus, with the anomaly determination method according to the present disclosure, it is possible to perform only the necessary determination functions, allowing a reduction in processing time.

[3.4 Advantageous Effects]

In the present embodiment, when a determination function is not performed, anomaly detection process functional group 370 stores the message received at this point, and when the detection processing time is long enough, performs the anomaly detection process on the message later. This allows anomaly detection process functional group 370 to not only make a determination that produces the most advantageous anomaly detection effects while meeting time constraints at the time of message reception, but also perform the anomaly detection process with the originally scheduled determination functions albeit with a delay in the timing. Thus, with the anomaly determination method, etc., according to the present disclosure, processing time constraints are met without compromising the anomaly detection performance.

[4. Other Variations]

The present disclosure is not limited to the embodiments described above. Various modifications to the embodiments that can be conceived by those skilled in the art, and forms configured by combining structural elements in different embodiments, without departing from the teachings of the present disclosure are included in the scope of the present disclosure. For example, the following variations are included in the present disclosure.

(1) In the above embodiments, anomaly detection process functional group 370 calculates available time for the anomaly detection process (detection processing time), and determines a determination function to be selected or whether or not to select a determination function that is to be performed in the anomaly detection process, according to whether or not the calculated detection processing time is longer than the time required for the detection process that is supposed to be performed; however, the present disclosure is not limited to the above embodiments. For example, a determination function to be selected or whether or not to select a determination function that is to be performed in the anomaly detection process may be determined according to the load factor, the data mount, the message amount, or the like in in-vehicle network system 10. Here, the load factor is the proportion of the amount of data or messages transmitted per unit time to the maximum value of the amount of data or messages that can be transmitted to an in-vehicle network.

Figure 34:
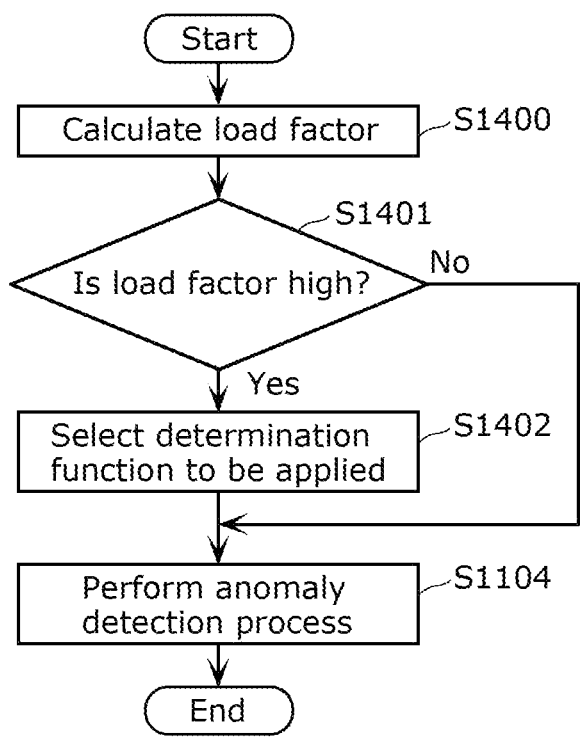
FIG. 34 is a flowchart illustrating one example of an anomaly detection process according to a variation.

FIG. 33 is a table illustrating a determination function and a selection condition for the determination function according to a variation. FIG. 34 is a flowchart illustrating one example of the anomaly detection process according to the variation. For example, FIG. 34 illustrates an example of a determination function that is selected according to the load factor. Determination function selector 371 may determine a determination function to be selected, on the basis of the information illustrated in FIG. 33, instead of the information illustrated in FIG. 7 according to Embodiment 1.

For example, assume that a load factor greater than or equal to 60% is defined as representing a high load; in the anomaly detection process illustrated in FIG. 34, when the load factor calculated in Step S1400 has a value greater than or equal to 60%, determination function selector 371 determines that "the load is high" (Step S1401).

Subsequently, on the basis of the information illustrated in FIG. 33, determination function selector 371 selects a determination function to be applied (Step S1402).

Next, controller 374 performs the anomaly detection process (Step S1104).

Furthermore, when determination function selector 371 does not determine that "the load is high" (No in Step S1401), controller 374 performs the anomaly detection process (Step S1104).

Figure 35:
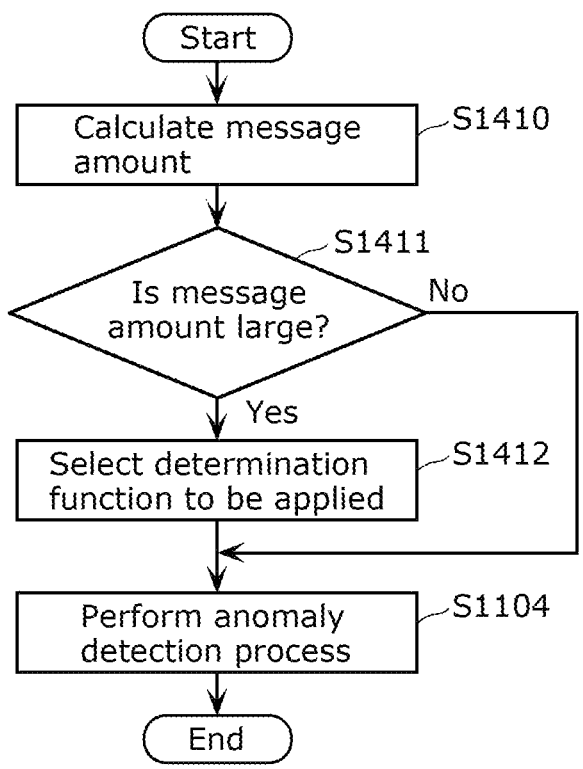
FIG. 35 is a flowchart illustrating another example of an anomaly detection process according to a variation.

FIG. 35 is a flowchart illustrating another example of the anomaly detection process according to the variation. The processing performed here is the same as that in FIG. 34 except that the load factor is replaced by the message amount. Furthermore, although not illustrated in the drawings, the same applies to the case where a determination function to be selected by determination function selector 371 is determined according to the data amount.

Note that instead of selecting a determination function only at the time of a high load, the state dependent on the load factor may be defined in three levels, namely, "high load", "middle load", and "low load", and a determination function to be selected by determination function selector 371 may be determined according to the level of the state, or these levels may be combined and a determination function to be selected by determination function selector 371 may be determined on the basis of conditions such as "high load", "high load" plus "middle load", and "every load". The state dependent on the load factor may be defined in two levels or four or more levels instead of the three levels.

Note that an index other than the load factor, the data amount, and the message amount may be used, or the load factor, the data amount, or the message amount may be calculated from the entire in-vehicle network. Furthermore, for example, in the case of gateway 300, a value related to an index such as the load factor, the data amount, or the message amount may be calculated for a message to be transferred by gateway 300, or a value related to an index such as the load factor, the data amount, or the message amount may be calculated for a message input to gateway 300.

Note that anomaly detection process functional group 370 may receive the load factor, the data amount, or the message amount from frame processor 350 and on the basis of thereof, select a determination function and control the execution of the determination function. Furthermore, the load factor, the data amount, or the message amount may be received upon a change in the level instead of every time a message is received. At this time, when anomaly detection process functional group 370 does not receive the load factor, the data amount, or the message amount from frame processor 350, anomaly detection process functional group 370 determines that these values are the same as the last ones.

Furthermore, on the basis of the vehicle status such as a vehicle being parked, traveling, traveling on an expressway, traveling at constant speed, self-driving, starting self-driving, ending self-driving, having the driving assistance function in action, starting the driving assistance function, and ending the driving assistance function, determination function selector 371 may select a determination function and controller 377 may control the execution of the determination function.

Note that on the basis of a determination function that is used in accordance with the detection rule set for each CAN ID and the detection processing time, the load factor, the data amount, and the message amount, determination function selector 371 may select a determination function and controller 377 may control the execution of the determination function. In other words, determination function selector 371 or controllers 374, 377 select a determination function from a combination of functions that are used in accordance with the detection rule.

Note that determination function selector 371 determines a determination function to be selected, on the basis of the information illustrated in FIG. 33, but this is not limiting. For example, determination function selector 371 may determine a determination function to be selected, from the combination of determination functions and the selection condition as illustrated in FIG. 41.

FIG. 35 is a flowchart illustrating another example of the anomaly detection process according to the variation.

First, controller 374 calculates a message amount (Step S1410).

Next, controller 374 determines whether or not the message amount is large (Step S1411).

When controller 374 determines that the message amount is larger than a predetermined value (Yes in Step S1411), controller 374 selects a determination function to be applied (Step S1412).

Furthermore, controller 374 performs the anomaly detection process (Step S1104).

Furthermore, when controller 374 determines that the message amount is less than the predetermined value (No in Step S1411), controller 374 performs the anomaly detection process (Step S1104).

Thus, with the anomaly determination method, etc., according to the present disclosure, even in the case where it is difficult to calculate the detection processing time or the case where the detection processing time cannot be uniquely determined, it is possible to select a determination function using other indexes such as the load factor, the data amount, and the message amount.

(2) In the above embodiment, ECU 100 is described as including frame transmitter/receiver 110, frame parser 120, receiving ID determiner 130, receiving ID list holder 140, frame processor 150, data obtainer 170, and frame generator 180, the configuration of the ECU included in the in-vehicle network system according to the present disclosure is not limited to this example.

Figure 36:
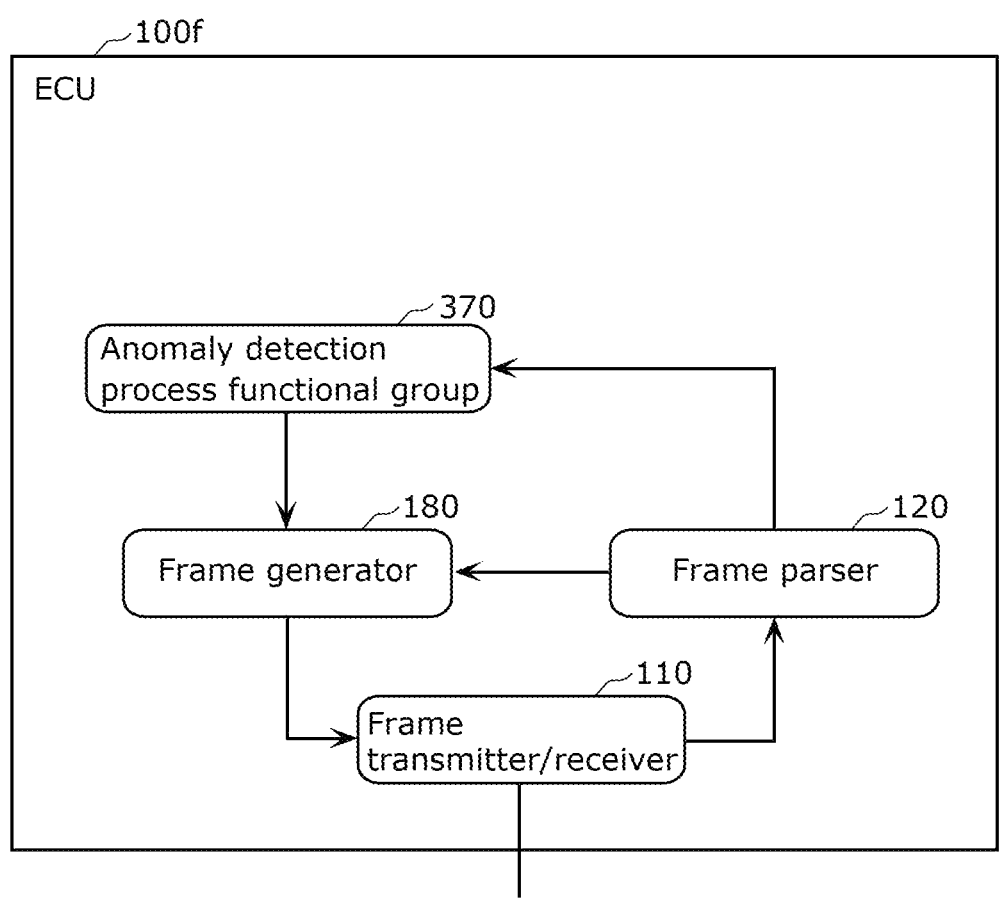
FIG. 36 is a block diagram illustrating one example of an ECU according to a variation.

FIG. 36 is a block diagram illustrating one example of an ECU according to a variation. In FIG. 36, ECU 100*f* includes frame transmitter/receiver 110, frame parser 120, frame generator 180, and anomaly detection process functional group 370. Frame parser 120 may, for example, receive all the messages regardless of the IDs thereof and request anomaly detection process functional group 370 to determine, for every message, whether or not the message is an anomalous message.

Furthermore, ECU 100*f* may include receiving ID determiner 130 and receiving ID list holder 140 in addition to the elements illustrated in FIG. 36 and receive only a message having a message ID described in the receiving ID list held by receiving ID list holder 140 and request anomaly detection process functional group 370 to determine whether or not the message is an anomalous message.

Note that ECU 100*g* may further include external communicator 390.

With this, it is possible to determine, not only by the gateway, but also by the ECU, whether or not the message transmitted to the in-vehicle network is an anomalous message. As a result, for example, the function for detecting an anomaly in the in-vehicle network system improves, ensuring the security with improved sophistication.

Figure 37:
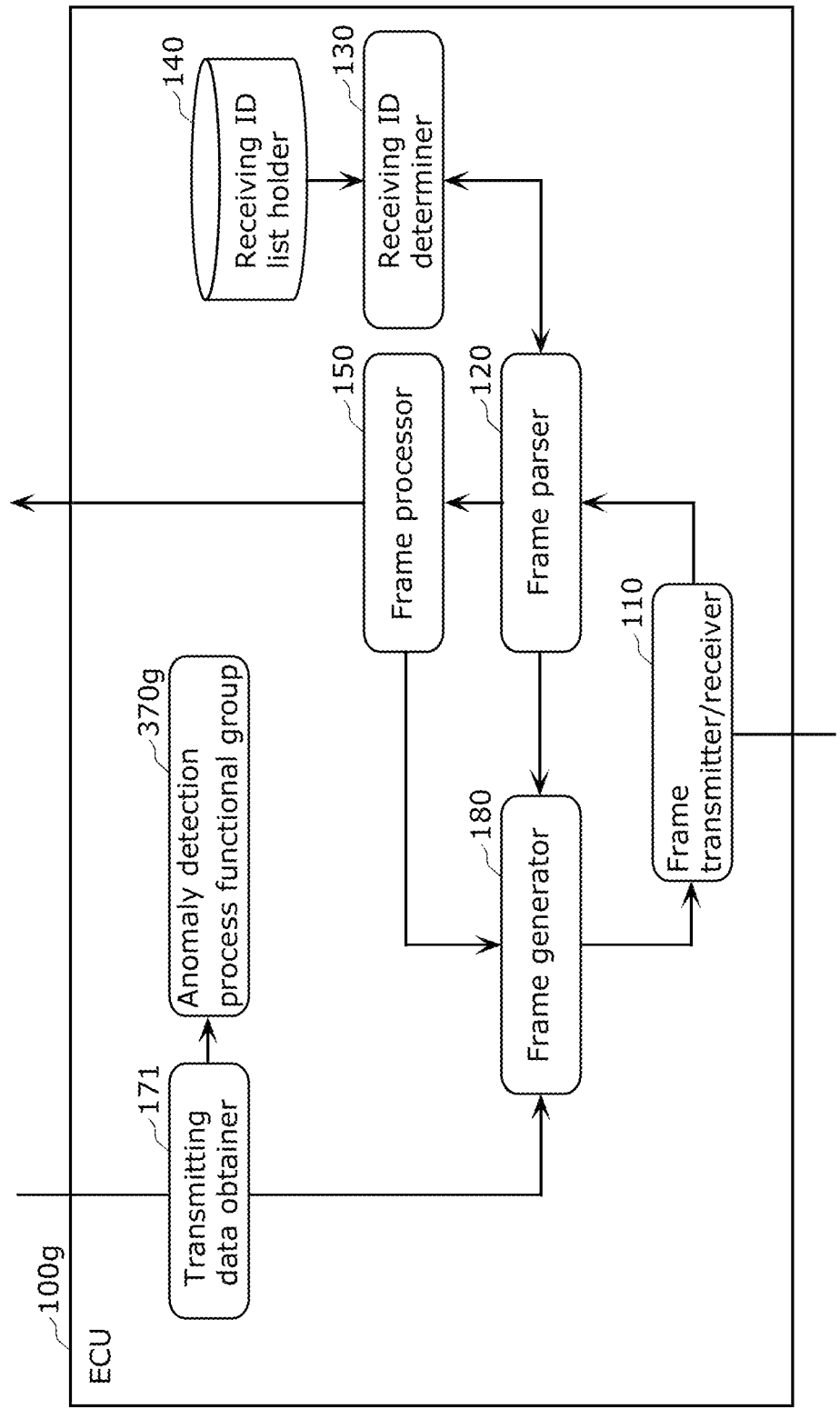
FIG. 37 is a block diagram illustrating another example of an ECU according to a variation.

FIG. 37 is a block diagram illustrating another example of the ECU according to the variation. ECU 100g illustrated in FIG. 37 may include anomaly detection process functional group 370g and transmitting data obtainer 171 that obtains, from another connected device, an external device, or the like, data to be transmitted to bus 200. Anomaly detection process functional group 370g included in ECU 100g may determine whether or not the data received from transmitting data obtainer 171 is an anomalous message, and only when determining that the received data is not an anomalous message, request frame generator 180 for message transmission.

Note that ECU 100g may further include external communicator 390.

Thus, with the anomaly determination method, etc., according to the present disclosure, for example, in the case where an anomalous message is transmitted from an automotive navigation system fraudulently manipulated from the outside to an ECU that is used along with an automotive navigation system, it is possible to suppress the spread of the message to an in-vehicle network including ECU 100g. Furthermore, with the anomaly determination method, etc., according to the present disclosure, an anomalous message that attempts to be transmitted from the outside of a vehicle can be inhibited from entering the in-vehicle network system.

(3) In the above embodiment, determination function selector 371 uses one criterion to determine a determination function to be selected or a determination function to be performed, but this is not limiting. For example, determination function selector 371 may use a different criterion for each CAN ID. Furthermore, in the case where more than one bus is connected to gateway 300, the ECU, or the like, determination function selector 371 may use a different criterion for each bus. Moreover, determination function selector 371 may use a different criterion for each vehicle status such as a vehicle being parked, traveling, traveling on an expressway, traveling at constant speed, self-driving, starting self-driving, ending self-driving, having the driving assistance function in action, starting the driving assistance function, and ending the driving assistance function.

Note that in the case where there is a criterion for each CAN ID, determination function selector 371 may avoid selecting a determination function for an important CAN ID, but select a determination function for an unimportant CAN ID. Furthermore, determination function selector 371 may select a different determination function according to the level of importance.

Thus, with the anomaly determination method, etc., according to the present disclosure, the execution of a determination function can be controlled with increased flexibility, therefore enabling optimal execution depending on various systems, various situations, etc.

(4) In the above embodiment, anomaly detection process functional group 370 returns the determination result to frame processor 350, but this is not limiting; anomaly detection process functional group 370 may return, together with the determination result, information about the determination function selected or information about the determination function performed.

With this, frame processor 350 or the like that has called anomaly detection process functional group 370 can check the likelihood of the determination result of anomaly detection process functional group 370.

(5) In the above embodiment, the in-vehicle network is cited as an example of a network communication system that performs communication in accordance with the CAN protocol. The technique according to the present disclosure is not limited to being used in the in-vehicle network, but may be used in a network of robots, industrial devices, etc., or a network communication system, other than the in-vehicle network, that performs communication in accordance with the CAN protocol.

The CAN protocol is used for the in-vehicle network, but this is not limiting. For example, the CAN with flexible data rate (CAN-FD), the FlexRay, the Ethernet, the local interconnect network (LIN), or the media oriented systems transport (MOST) may be used. Alternatively, a network obtained by combining these networks as sub-networks may be used.

For example, in the case of the Ethernet, determination function selector 371 selects a determination function from among the DoS attack determination function, a transmission source address determination function, a transmission destination address determination function, a protocol determination function, a transmission source port number determination function, a transmission destination port number determination function, the data value determination function, and the like. Alternatively, it is sufficient that determination function selector 371 select one or more determination functions from among these determination functions as a determination function to be performed by controller 377. Substantially the same processing as that in the case of the CAN or the Ethernet is performed on the function of determining header information or the value of a payload in other network standards than the Ethernet.

(6) Gateway 300 in the above embodiment may include a first processor and a second processor, and in anomaly detection process functional group 370, the function of determination function selector 371 may be processed using the first processor, and the functions of controller 372 and anomaly detector 373 may be processed using the second processor. At this time, the selection result of determination function selector 371 is sent from the first processor to the second processor. Furthermore, in the second processor, controller 372 may control the determination function of anomaly detector 373 according to the selection result sent from determination function selector 371.

Furthermore, gateway 300 includes a third processor, a fourth processor, and a fifth processor. The third processor includes a processing time calculator that calculates detection processing time, which is used to be calculated by determination function selector 371, and the detection processing time calculated by the processing time calculator is sent to the fourth processor. In the fourth processor, determination function selector 371 selects a determination function according to the detection processing time, and the selection result is sent to the fifth processor. In the fifth processor, according to the sent selection result, controller 372 may control the determination function of anomaly detector 373.

Furthermore, the first processor may include determination function selector 371, controller 372, and anomaly detector 373, and the second processor may include controller 372 and anomaly detector 373. In the first processor, determination function selector 371 may select a determination function that has not been selected at the time of the anomaly detection process using anomaly detector 373 of the first processor, and send the determination function to the second processor, and controller 372 and anomaly detector 373 of the second processor may perform the anomaly detection process; in this way, the anomaly detection process originally desired to be performed may be performed.

Figure 38:
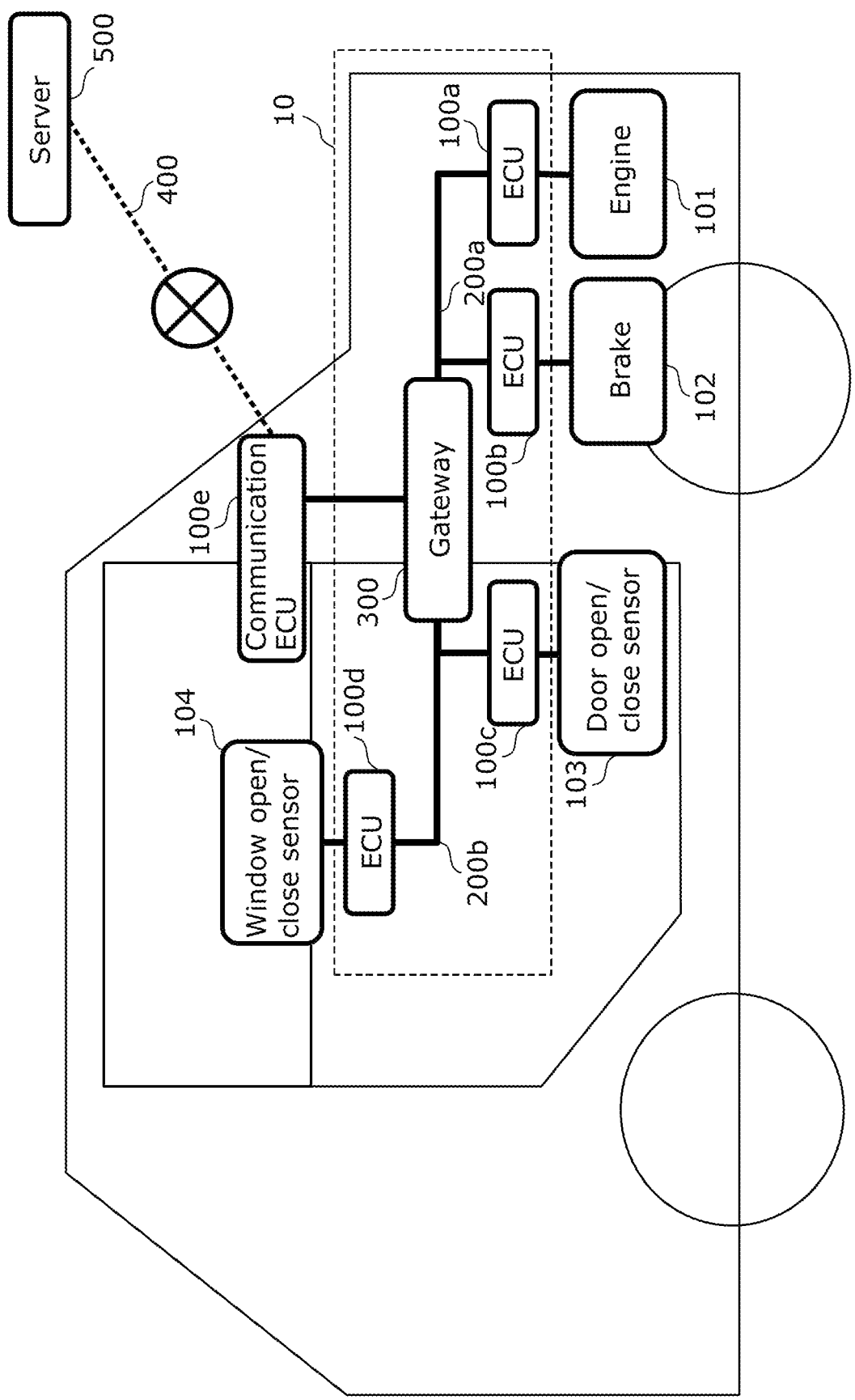
FIG. 38 is a block diagram illustrating the overall configuration of an in-vehicle network system according to a variation.
Figure 39:
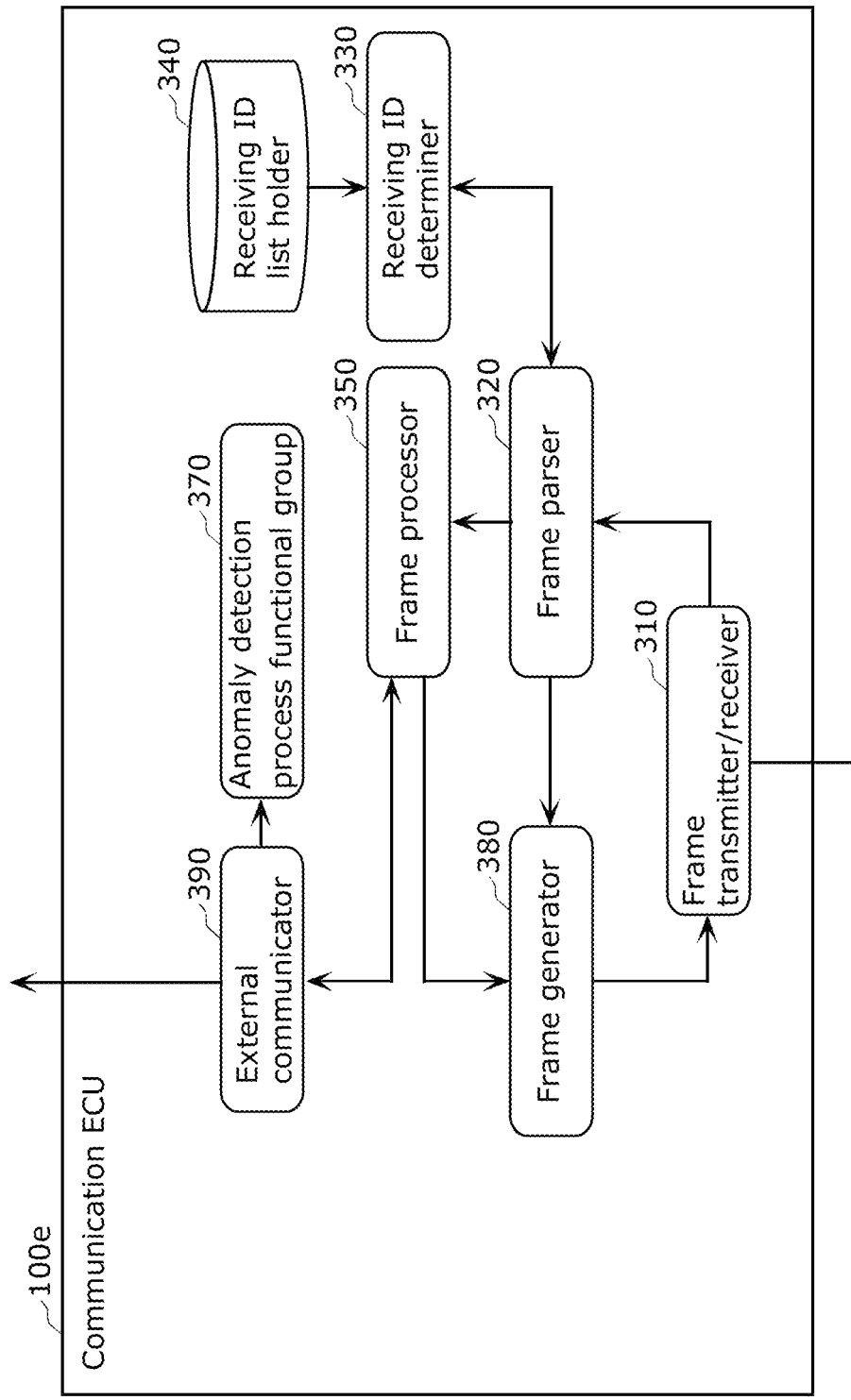
FIG. 39 is a block diagram illustrating one example of a communication ECU included in an in-vehicle network system according to a variation.

Aside from the sectioned processor in gateway 300, there may be the second processor and the fifth processor in gateway 300, and there may be the first processor, the third processor, and the fourth processor in another ECU. FIG. 38 is a block diagram illustrating the overall configuration of an in-vehicle network system according to a variation. FIG. 39 is a block diagram illustrating one example of a communication ECU included in the in-vehicle network system according to the variation. As illustrated in FIG. 38, the in-vehicle network system may include communication ECU 100e and communicate with server 500 via external network 400, and as illustrated in FIG. 39, communication ECU 100e may include external communicator 390 and send, to server 500, a message received from the in-vehicle network, an anomaly detection process result of anomaly detection process functional group 370 and information about the performed determination function.

Figure 40:
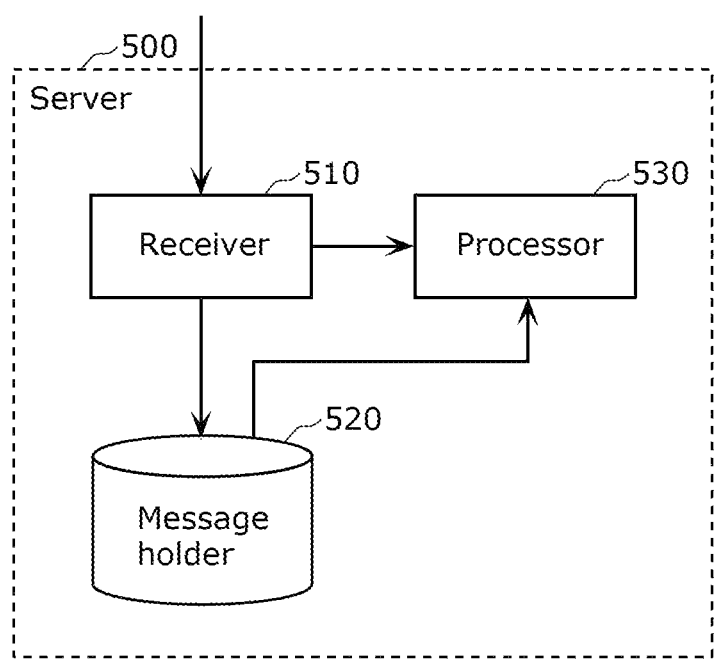
FIG. 40 is a block diagram illustrating one example of a server according to a variation.

FIG. 40 is a block diagram illustrating one example of a server according to a variation. FIG. 41 is a table illustrating a determination function and a selection condition for the determination function according to the variation. As illustrated in FIG. 40, server 500 may include receiver 510, message holder 520, and processor 530, and the aforementioned first and fourth processors may be processor 530. Furthermore, processor 530 may include a display and an input unit and display the detection processing time, the load factor, the data amount, the message amount, the vehicle status, or the like, and an operator may select, with reference to the displayed information or externally acquired information, a determination function to be performed, and input the selection result via the input unit.

The input result may be sent from server 500 to controller 372, and controller 372 may control the determination function of anomaly detector 373 according to the input result. Furthermore, when server 500 determines, from the information about the determination function performed by anomaly detector 373, that the determination function originally desired to be performed has not been performed, processor 530 of server 500 may perform the anomaly detection process on the message.

Thus, the in-vehicle network system according to the present disclosure can be implemented with a flexible configuration and therefore can be configured to meet various system constraints.

(7) Each device in the above embodiment is specifically a computer system made up of a microprocessor, read only memory (ROM), random access memory (RAM), a hard disk unit, a display unit, a keyboard, a mouse, and so on. A computer program is recorded in the RAM or the hard disk unit. Each device achieves its functions by way of the microprocessor operating according to the computer program. Here, the computer program is configured of a combination of a plurality of command codes indicating instructions to a computer in order to achieve a predetermined function.

(8) Some or all of the structural elements included in each device in the above embodiment may be one system LSI (Large Scale Integration: large scale integrated circuit). The system LSI is a super multifunctional LSI manufactured by integrating a plurality of components onto a single chip. Specifically, the system LSI is a computer system configured of a microprocessor, ROM, RAM, and so on. A computer program is recorded in the RAM. The system LSI achieves its function by way of the microprocessor operating according to the computer program.

Furthermore, each unit of the structural elements included in each device described above may be individually configured into single chips, or some or all of the units may be configured into a single chip.

Moreover, although the foregoing describes some or all of the structural elements included in each device in the embodiment as being a system LSI, the integrated circuit can also be called an IC, a LSI, a super LSI, and an ultra LSI, depending on the level of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. The circuit integration technology that replaces LSI include possibilities of the application of biotechnology and the like.

(9) Some or all of the structural elements included in each device described above may be implemented as a standalone module or an IC card that can be inserted into and removed from the device. The IC card or the module is a computer system made up of a microprocessor, ROM, RAM, and so on. The IC card or the module may include the aforementioned super multifunctional LSI. The IC card or the module achieves its functions by way of the microprocessor operating according to the computer program. The IC card and the module may be tamperproof.

(10) The present disclosure may be a computer program for implementing the above-described methods using a computer or may be a digital signal of the computer program.

Furthermore, the present disclosure may be a computer program or a digital signal recorded on a computer-readable recording medium, such as a flexible disk, a hard disk, a compact disc (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be the digital signal recorded on these recoding media.

Furthermore, in the present disclosure, the computer program or the digital signal may be transmitted via an electrical communication line, a wireless or wired communication line, a network represented by the Internet, data broadcasting, or the like.

Furthermore, the present disclosure may be a computer system including a microprocessor and a memory. The memory may have the computer program recorded therein, and the microprocessor may operate according to the computer program.

Moreover, by transferring the recording medium having the program or the digital signal recorded thereon or by transferring the program or the digital signal via the network or the like, the present disclosure may be implemented by a different independent computer system.

(11) The above embodiment and the above variations may be combined with each other.

Hereinbefore, a technique for determining a message that is used as a criterion for detecting unauthorized communication with the aim of unauthorized control using fraudulent messages in an in-vehicle network according to one or more aspects has been described based on the embodiment and the variations thereof.

In these embodiment and variations thereof, a message to be used as the criterion for detecting unauthorized communication is determined by the gateway or the ECU that is connected to the in-vehicle network system to perform communication, or a combination of these and a server computer.

A system that includes one or more processors and storage and performs such processing for detecting unauthorized communication is referred to as an unauthorized communication detecting criterion determination system in the present disclosure.

Therefore, the unauthorized communication detecting criterion determination system includes not only one device such as one gateway connected to the in-vehicle network system, but also two or more devices such as a combination of the gateway and the ECU and a combination of the gateway or the ECU and a remotely located server computer.

Furthermore, this technique can be implemented as a method including some or all of steps of processing that is performed by the structural elements in the above embodiment or variations thereof, or a program to be performed by a processor of the unauthorized communication detecting criterion determination system to allow the unauthorized communication detecting criterion determination system to perform this method.

Furthermore, processing that is performed by a specific structural element in the above embodiment or variations thereof may be performed by a different structural element instead of the specific structural element. Moreover, the order of a plurality of processes may be changed, and a plurality of processes may be performed in parallel.

The above-described anomaly determination method may be performed by an anomaly determination device including one or more processors and storage accessible from the one or more processors. This anomaly determination device may be gateway 300, server 500, or the like or may be included in gateway 300, server 500, or the like.

Advantageous Effects, Etc.

An anomaly determination method according to the present disclosure is an anomaly determination method for determining an anomaly in a received message and includes: receiving, as the received message, each of a plurality of messages that are periodic and include a first field having a fixed value and a second field having a variable value; and selecting, according to one or more criteria among available execution time of the anomaly determination method, a load amount, a data amount, and a total number of messages, one of a plurality of combinations to be used for determination each of which includes at least one of anomaly determination utilizing a reception timing based on the periodicity or a total number of received messages, anomaly determination utilizing a field having the fixed value, and anomaly determination utilizing a field having the variable value.

Thus, with the anomaly determination method according to the present disclosure, it is possible to carry out the processing while selecting an anomaly determination to be performed within a limited period of time. Accordingly, with the anomaly determination method according to the present disclosure, it is possible to effectively determine an anomaly in received messages.

Furthermore, in the anomaly determination method according to the present disclosure, the anomaly determination in the one of the plurality of combinations selected may be performed.

Thus, with the anomaly determination method according to the present disclosure, it is possible to effectively determine an anomaly in received messages within a limited period of time by performing a combination of anomaly determination selected in advance.

Furthermore, in the anomaly determination method according to the present disclosure, when the anomaly determination method is performed and, among the plurality of anomaly determinations, an anomaly determination utilizing last round information has not been performed, the last round information to be used in the anomaly determination utilizing the last round information may be reset a next time the anomaly determination method is performed.

Thus, with the anomaly determination method according to the present disclosure, in the case where certain anomaly determination is skipped and then the same anomaly determination is performed, it is possible to avoid, at the time of performing the same anomaly determination, a failure to perform normal determination due to normal data not having been recorded as a result of skipping of the anomaly determination. Accordingly, with the anomaly determination method according to the present disclosure, it is possible to effectively determine an anomaly in received messages.

Furthermore, in the anomaly determination method according to the present disclosure, when a load factor in a network for receiving a message as the received message falls below a predetermined threshold value, information of the received message that has been received in an immediately preceding round and is of a different type may be used as substitute information for the last round information that has been reset.

Thus, with the anomaly determination method according to the present disclosure, in the case where certain anomaly determination is skipped and then the same anomaly determination is performed, it is possible to avoid, at the time of performing the same anomaly determination, a situation in which the anomaly determination process cannot be performed due to normal data not having been recorded as a result of skipping of the anomaly determination. In other words, with the anomaly determination method according to the present disclosure, in the above-described case, by using information of the received message that has been received in the immediately preceding round and has different ID, it is possible to perform the same anomaly determination process as the anomaly determination process that has been skipped.

Furthermore, in the anomaly determination method according to the present disclosure, after the selected determination process is performed, when there is time to spare within the available execution time of the anomaly determination method, the anomaly determination that is not selected may be performed.

Thus, with the anomaly determination method according to the present disclosure, more types of anomaly determination can be performed. Accordingly, with the anomaly determination method according to the present disclosure, it is possible to determine an anomaly more effectively in received messages.

The anomaly determination device according to the present disclosure is used in an in-vehicle network system including a network and one or more electronic control units connected to the network and includes: one or more processors; and storage accessible to the one or more processors. The one or more processors receive each of a plurality of messages including messages that are periodic and including a first field having a fixed value and a second field having a variable value from the network as a received message. The one or more processors select one of a plurality of combinations to be used for determination, according to one or more criteria among available execution time of an anomaly determination method performed by the anomaly determination device, a load amount, a data amount, and a total number of messages. Each of the plurality of combinations includes at least one of a plurality of anomaly determinations including an anomaly determination utilizing a reception timing based on the periodicity or a total number of received messages, an anomaly determination utilizing the first field, and an anomaly determination utilizing the second field.

Thus, the anomaly determination device according to the present disclosure can produce substantially the same advantageous effects as in the above-described anomaly determination method.

Furthermore, the non-transitory computer-readable recording medium according to the present disclosure may be a non-transitory computer-readable recording medium having recorded thereon a program for causing a computer to perform the anomaly determination method according to one aspect of the present disclosure.

Thus, the non-transitory computer-readable recording medium according to the present disclosure can produce substantially the same advantageous effects as in the above-described anomaly determination method.

Note that in the anomaly determination method according to the present disclosure, when the available execution time of the anomaly determination method is determined as being shorter than a predetermined time, at least one anomaly determination combination that is lower in the rate of false detection and higher in the rate of detection than predetermined criteria may be performed among anomaly determination utilizing a reception timing based on the periodicity or a total number of received messages, anomaly determination utilizing the first field, and anomaly determination utilizing the second field.

Thus, with the anomaly determination method according to the present disclosure, it is possible to determine an anomaly more effectively in received messages.

Note that in the anomaly determination method according to the present disclosure, when the available execution time of the anomaly determination method is determined as being shorter than the predetermined time, the anomaly determination utilizing the reception timing based on the periodicity or the total number of received messages and the anomaly determination utilizing the second field are not required to be performed.

Thus, in the anomaly determination method according to the present disclosure, by performing only the anomaly determination utilizing the field having a variable value, it is possible to determine an anomaly more effectively in received message within a limited period of time.

In the anomaly determination method according to the present disclosure, when the available execution time of the anomaly determination method is determined as being shorter than the predetermined time, the processing may selectively end before one of the anomaly determination utilizing the reception timing based on the periodicity or the total number of received messages, the anomaly determination utilizing the first field, and the anomaly determination utilizing the second field. Thus, with the anomaly determination method according to the present disclosure, it is possible to more effectively determine an anomaly in received messages within a limited period of time.

In the anomaly determination method according to the present disclosure, when the available execution time of the anomaly determination method is determined as being shorter than the predetermined time, information about anomaly determination that has been determined as not being performed among the anomaly determination utilizing the reception timing based on the periodicity or the total number of received messages, the anomaly determination utilizing the field having a fixed value, and the anomaly determination utilizing the field having a variable value or information about a message subject to the anomaly determination that has been determined as not being performed may be stored into memory.

Thus, in the anomaly determination method according to the present disclosure, the anomaly determination that has been determined as not being performed can be performed later according to situations. Thus, with the anomaly determination method according to the present disclosure, it is possible to more effectively determine an anomaly in received messages.

INDUSTRIAL APPLICABILITY

The anomaly determination method, etc., according to the present disclosure can be used for message anomaly detection or the like in an in-vehicle network. Furthermore, with the anomaly determination method, etc., according to the present disclosure, it is possible to perform an appropriate anomaly detection process in accordance with available detection processing time for the anomaly detection process. Thus, with the anomaly determination method, etc., according to the present disclosure, a normal message can be distinguished with high accuracy even at a point in time when a conventional anomaly detection process cannot be performed, thereby allowing network protection.

The invention claimed is:

1. An anomaly determination method used by an anomaly determination device in an in-vehicle network system including a network and one or more electronic control units connected to the network, the anomaly determination method comprising:

receiving, as a received message, each of a plurality of messages that includes a first field having a fixed value for messages of a same type, the plurality of messages including messages that are periodic;

determining a level based on at least one of available time for an anomaly determination process, a load factor that is a proportion of an amount of data transmitted to the network per unit time to a maximum amount of data that can be transmitted to the network per unit time, a data amount transmitted to the network, and a total number of messages transmitted to the network; and selecting, in accordance with the level determined in said determining, one of (i) selecting all n anomaly determination functions out of n anomaly determination functions, where n is a positive integer, (ii) selecting k anomaly determination functions out of the n anomaly determination functions, where k is a positive integer and smaller or equal to n, and (iii) not selecting any anomaly determination functions out of the n anomaly determination functions, the n anomaly determination functions including anomaly determinations including an anomaly determination utilizing a reception timing based on the periodicity or a total number of received messages, and an anomaly determination utilizing the first field.

2. The anomaly determination method according to claim 1,
wherein the level determined in said determining is one of at least three levels.

3. The anomaly determination method according to claim 1,
wherein each of the plurality of messages includes a second field having a variable value for the messages of the same type, and
the n anomaly determination functions further include an anomaly determination utilizing the second field.

4. The anomaly determination method according to claim 1,
wherein the selecting comprises selecting, using the available time for an anomaly determination process, one of (i) selecting all n anomaly determination functions out of the n anomaly determination functions, (ii) selecting k anomaly determination functions out of the n anomaly determination functions, and (iii) not selecting any anomaly determination functions out of the n anomaly determination functions.

5. The anomaly determination method according to claim 1,
wherein the anomaly determination utilizing a reception timing based on the periodicity or a total number of received messages includes a Denial of Service (DOS) attack determination function.

6. The anomaly determination method according to claim 1,
wherein the k anomaly determination functions include a Denial of Service (DOS) attack determination function.

7. The anomaly determination method according to claim 1,
wherein the k anomaly determination functions include only a Denial of Service (DOS) attack determination function.

8. The anomaly determination method according to claim 1,
wherein at least one anomaly determination function selected is notified, in a case where at least one of the n anomaly determination functions is selected.

9. The anomaly determination method according to claim 1 further comprising:
executing the anomaly determination function selected, in a case where at least one of the n anomaly determination functions is selected.

10. The anomaly determination method according to claim 9, wherein
after executing the anomaly determination function selected, when the available time for anomaly determination process is left, the anomaly determination that is not selected among the plurality of anomaly determination functions is executed.

11. The anomaly determination method according to claim 1, wherein
the n anomaly determination functions include a first anomaly determination function that utilizes first information obtained when the first anomaly determination function has executed last time, and
in a case where the first anomaly determination function is not executed last time, the first information is reset when the at least one anomaly determination function selected is executed.

12. The anomaly determination method according to claim 11, wherein
when the load factor falls below a predetermined threshold value, information of the received message of a different type that has been received in an immediately before is used as the first information.

13. A non-transitory computer-readable recording medium having recorded thereon a program for causing a computer to perform the anomaly determination method according to claim 1.

14. An anomaly determination device in an in-vehicle network system including a network and one or more electronic control units connected to the network, the anomaly determination device comprising:
one or more processors; and
storage accessible to the one or more processors, wherein
the one or more processors receive each of a plurality of messages that includes a first field having a fixed value for messages of a same type from the network as a received message, the plurality of messages including messages that are periodic,
the one or more processors determine a level based on at least one of available time for an anomaly determination process executed by the anomaly determination device, a load factor that is a proportion of an amount of data transmitted to the network per unit time to a maximum amount of data that can be transmitted to the network per unit time, a data amount transmitted to the network, and a total number of messages transmitted to the network, and
the one or more processors select, in accordance with the level determined by the one or more processors, one of (i) selecting all n anomaly determination functions out of n anomaly determination functions, where n is a positive integer, (ii) selecting k anomaly determination functions out of the n anomaly determination functions, where k is a positive integer and smaller or equal to n, and (iii) not selecting any anomaly determination functions out of the n anomaly determination functions, the n of anomaly determination functions including anomaly determinations including an anomaly determination utilizing a reception timing based on the periodicity or a total number of received messages, and an anomaly determination utilizing the first field.

* * * * *